United States Patent
Kim et al.

(10) Patent No.: US 11,316,633 B2
(45) Date of Patent: Apr. 26, 2022

(54) BANDWIDTH-DEPENDENT POSITIONING REFERENCE SIGNAL (PRS) TRANSMISSION FOR NARROWBAND INTERNET OF THINGS (NB-IOT) OBSERVED TIME DIFFERENCE OF ARRIVAL (OTDOA) POSITIONING

(71) Applicant: QUALCOMM Incorporated, San Diego, CA (US)

(72) Inventors: Tae Min Kim, San Diego, CA (US); Jae Ho Ryu, San Diego, CA (US); Alberto Rico Alvarino, San Diego, CA (US); Le Liu, Fremont, CA (US); Sven Fischer, Nuremberg (DE); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/268,244

(22) Filed: Feb. 5, 2019

(65) Prior Publication Data
US 2019/0245663 A1 Aug. 8, 2019

Related U.S. Application Data
(60) Provisional application No. 62/628,180, filed on Feb. 8, 2018.

(51) Int. Cl.
*H04L 5/00* (2006.01)
*H04W 72/08* (2009.01)
(Continued)

(52) U.S. Cl.
CPC .............. *H04L 5/0048* (2013.01); *G01S 1/20* (2013.01); *H04L 5/0091* (2013.01);
(Continued)

(58) Field of Classification Search
CPC . H04L 5/0048; H04L 5/0091; H04L 27/2663; H04L 5/0023; H04L 27/2613;
(Continued)

(56) References Cited

U.S. PATENT DOCUMENTS

| 2002/0130817 A1* | 9/2002 | Forster | G01S 13/765 |
| | | | 343/770 |
| 2003/0188252 A1* | 10/2003 | Kim | H04L 1/0054 |
| | | | 714/779 |

(Continued)

OTHER PUBLICATIONS

3GPP TS 36.211 V14.5.0 (Dec. 2017): "3GPP TS 36.211 V14.5.0 (Dec. 2017); 3rd Generation Partnership Project; Technical Specification Group Radio Access Network; Evolved Universal Terrestrial Radio Access (E-UTRA); Physical Channels and Modulation (Release 14)," 3GPP Standard; Technical Specification; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.5.0, Jan. 9, 2018, pp. 156-197.

(Continued)

Primary Examiner — Gregory B Sefcheck
Assistant Examiner — Joshua Smith
(74) Attorney, Agent, or Firm — Thien T. Nguyen

(57) ABSTRACT

Disclosed are techniques for transmitting and receiving an extended narrowband positioning reference signal (NPRS) sequence. In an aspect, a base station generates the extended NPRS sequence and transmits, to at least one user equipment (UE) over a wireless narrowband channel, the extended NPRS sequence. In an aspect, a UE receives, over the wireless narrowband channel, an NPRS of a first subset of the extended NPRS sequence and measures the NPRS of the first subset of the extended PRS sequence. In an aspect, the extended NPRS sequence may be a function of a plurality of slot numbers of a plurality of slots of a plurality of sequential (Continued)

radio frames and a plurality of symbol indexes of a plurality of symbols of a single physical resource block.

20 Claims, 20 Drawing Sheets

(51) Int. Cl.
*H04L 27/26* (2006.01)
*H04W 64/00* (2009.01)
*G01S 1/20* (2006.01)
*H04W 88/08* (2009.01)
*H04W 88/02* (2009.01)
*G01S 5/02* (2010.01)

(52) U.S. Cl.
CPC ......... *H04L 27/2663* (2013.01); *H04W 64/00* (2013.01); *H04W 72/085* (2013.01); *G01S 5/0205* (2013.01); *H04L 5/0023* (2013.01); *H04L 27/2613* (2013.01); *H04L 27/2671* (2013.01); *H04L 27/2675* (2013.01); *H04L 27/2692* (2013.01); *H04W 88/02* (2013.01); *H04W 88/08* (2013.01)

(58) Field of Classification Search
CPC ............. H04L 27/2671; H04L 27/2675; H04L 27/2692; G01S 1/20; G01S 5/0205; G01S 1/045; H04W 64/00; H04W 72/085; H04W 88/02; H04W 88/08
See application file for complete search history.

(56) References Cited

U.S. PATENT DOCUMENTS

| | | | | |
|---|---|---|---|---|
| 2004/0266429 A1* | 12/2004 | Hui | .................. | H04W 48/12 455/434 |
| 2009/0310475 A1* | 12/2009 | Seo | .................. | H04L 5/0007 370/203 |
| 2010/0267408 A1* | 10/2010 | Lee | .................. | H04W 52/243 455/509 |
| 2011/0165879 A1* | 7/2011 | Brunel | .................. | H04W 40/22 455/450 |
| 2012/0051445 A1* | 3/2012 | Frank | .................. | H04L 27/2607 375/259 |
| 2013/0051371 A1* | 2/2013 | Ko | .................. | H04L 5/0055 370/335 |
| 2013/0285856 A1* | 10/2013 | Opshaug | .................. | G01S 5/0036 342/464 |
| 2014/0010187 A1* | 1/2014 | Huang | .................. | H04L 5/0039 370/329 |
| 2015/0198696 A1* | 7/2015 | Liu | .................. | G01S 5/10 370/329 |
| 2016/0065342 A1* | 3/2016 | Mirbagheri | .................. | H04W 72/02 370/330 |
| 2018/0020423 A1 | 1/2018 | Wang et al. | | |
| 2018/0054286 A1* | 2/2018 | Tang | .................. | G01S 5/10 |
| 2018/0097596 A1* | 4/2018 | Palanivelu | .................. | H04W 56/001 |
| 2019/0007923 A1* | 1/2019 | Blankenship | .................. | H04W 24/10 |
| 2019/0014560 A1* | 1/2019 | Takeda | .................. | H04W 72/0446 |
| 2019/0215121 A1* | 7/2019 | Lin | .................. | H04L 5/005 |
| 2019/0246371 A1* | 8/2019 | Hwang | .................. | H04W 80/08 |
| 2019/0265326 A1* | 8/2019 | Lin | .................. | H04W 64/00 |

OTHER PUBLICATIONS

Institute for Information Industry (III): "Discussion on OTDOA for eNB-IoT", 3GPP Draft; 3GPP TSG RAN WG1 Meeting #86, R1-167740, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051140795, Retrieved from the Internet: URL: https://www.3gpp.org/ftp/Meetings_3GPP_SYNC/RAN1/Docs/ [retrieved on Aug. 21, 2016], 2 pages.

International Search Report and Written Opinion—PCT/US2019/016847—ISA/EPO—dated Jun. 3, 2019.

Qualcomm Incorporated: "3GPP TSG RAN WG1 Meeting#92; R1-1802300; On NPRS Performance," 3GPP Draft; R1-1802300 NPRS, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 26, 2018-Mar. 3, 2018, Feb. 17, 2018, XP051397828, 6 pages, Retrieved from the Internet: URL: http://www.3gpp.org/ftp/tsg%5Fran/WG1%5FRL1/TSGR1%5F92/Docs/ [retrieved on Feb. 17, 2018] the whole document.

Xingqin L., et al: "Positioning for the Internet of Things: A 3GPP Perspective," IEEE Communications Magazine, IEEE Service Center, Piscataway, US, vol. 55 (12), Dec. 1, 2017, pp. 179-185, XP011674414, ISSN: 0163-6804, DOI: 10.1109/MCOM.2017.1700269 [retrieved on Dec. 13, 2017] the whole document.

* cited by examiner

| PRS Config | Number of NPRS Subframes Observed | | | | |
|---|---|---|---|---|---|
| | 40 | 80 | 160 | 320 | 640 |
| Non-colliding | 37.88Ts | 24.03Ts | 17.04Ts | 12.22Ts | 8.53Ts |
| Colliding | 43.94Ts | 37.01Ts | 32.75Ts | 29.57Ts | 27.14Ts |

Normal Coverage (SINR >= -6dB)

| PRS Config | Number of NPRS Subframes Observed | | | | |
|---|---|---|---|---|---|
| | 40 | 80 | 160 | 320 | 640 |
| Non-colliding | 314.08Ts | 54.44Ts | 33.33 | 23.64Ts | 16.47Ts |
| Colliding | 266.14Ts | 61.16Ts | 45.79Ts | 36.79Ts | 31.81Ts |

Enhanced Coverage (-6dB > SINR >=-15dB )

FIG. 5

BANDWIDTH-DEPENDENT POSITIONING REFERENCE SIGNAL (PRS) TRANSMISSION FOR NARROWBAND INTERNET OF THINGS (NB-IOT) OBSERVED TIME DIFFERENCE OF ARRIVAL (OTDOA) POSITIONING

CROSS-REFERENCE TO RELATED APPLICATIONS

The present Application for Patent claims the benefit of U.S. Provisional Application No. 62/628,180, entitled "BANDWIDTH-DEPENDENT POSITIONING REFERENCE SIGNAL (PRS) TRANSMISSION FOR NARROWBAND INTERNET OF THINGS (NB-IOT) OBSERVED TIME DIFFERENCE OF ARRIVAL (OTDOA) POSITIONING," filed Feb. 8, 2018, assigned to the assignee hereof, and expressly incorporated herein by reference in its entirety.

BACKGROUND

1. Field of the Disclosure

Aspects of the disclosure relate to bandwidth-dependent Positioning Reference Signal (PRS) transmission for NarrowBand Internet of Things (NB-IoT) Observed Time Difference of Arrival (OTDOA) positioning.

2. Description of the Related Art

Support for NarrowBand Internet of Things (NB-IOT) is being standardized by the 3$^{rd}$ Generation Partnership Project (3GPP) and is being deployed by network operators. An NB-IoT user equipment (UE) (also referred to as an NB-IoT mobile device) utilizes narrowband operation for the transmission and reception of physical channels and signals. The maximum carrier bandwidth in NB-IoT is only 200 KHz, with a usable bandwidth of 180 KHz (i.e., one (1) Long-Term Evolution (LTE) resource block (RB)). Because of the limitations of NB-IOT UEs, such as narrowband processing, single receiver (Rx) antennas, poorer coverage conditions, and the like, the utilization of legacy LTE wideband PRS for positioning of UEs may not be optimal for NB-IOT UEs, as accurate positioning needs either a wide bandwidth PRS or a large number of narrow bandwidth PRS subframe repetitions, which may result in network overhead and/or additional complexity in UEs. Improvement in PRS support for NB-IoT UEs is therefore desirable.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for transmitting an extended NPRS sequence includes generating, by a base station, the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and transmitting, by the base station to at least one UE over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers.

In an aspect, a method for measuring an extended NPRS sequence includes receiving, at a UE over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and measuring, by the UE, the NPRS of the first subset of the extended NPRS sequence.

In an aspect, an apparatus for transmitting an extended NPRS sequence includes at least one processor of a base station configured to generate the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and a transmitter of the base station configured to transmit, to at least one UE over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers.

In an aspect, an apparatus for measuring an extended NPRS sequence includes a transceiver of a UE configured to receive, over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and at least one processor of the UE configured to measure the NPRS of the first subset of the extended NPRS sequence.

In an aspect, a base station configured to transmit an extended NPRS sequence includes means for generating the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and means for transmitting, to at least one UE over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers.

In an aspect, a UE configured to measure an extended NPRS sequence includes means for receiving, over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and means for measuring the NPRS of the first subset of the extended NPRS sequence.

In an aspect, a non-transitory computer-readable medium storing computer-executable instructions for transmitting an extended NPRS sequence includes computer-executable instructions comprising at least one instruction instructing a base station to generate the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and at least one instruction instructing the base station to transmit, to at least one UE over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers.

In an aspect, a non-transitory computer-readable medium storing computer-executable instructions for measuring an extended NPRS sequence includes computer-executable instructions comprising at least one instruction instructing a UE to receive, over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, and at least one instruction instructing the UE to measure the NPRS of the first subset of the extended NPRS sequence.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 5 illustrates a comparison between the colliding and non-colliding PRS scenarios for different coverages.

Figure 1:
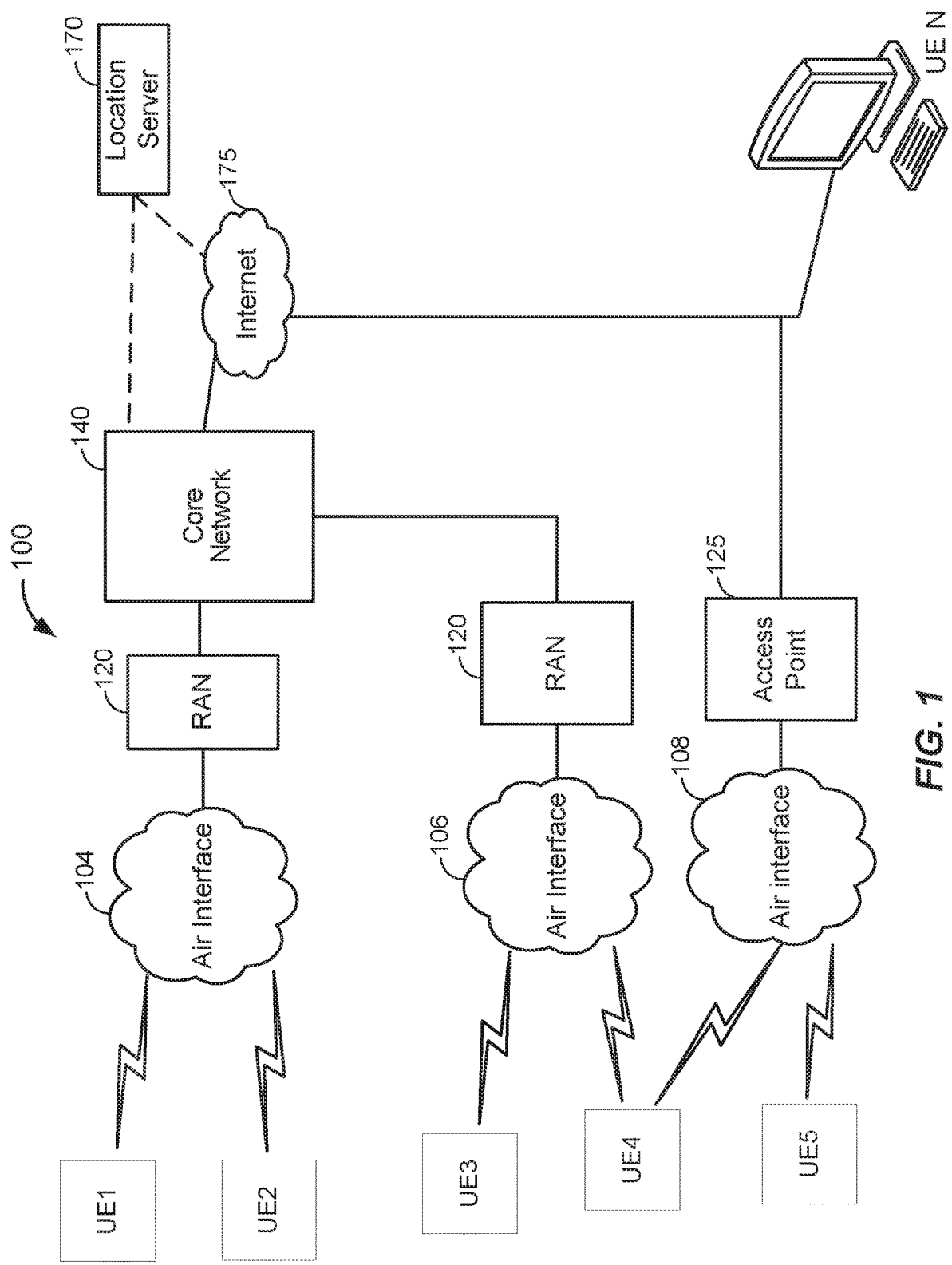
FIG. 1 illustrates a high-level system architecture of a wireless communications system in accordance with an aspect of the disclosure.

Elements in different figures with like numbers may correspond to one another. Elements in figures with a like number and different suffixes may be different instances of the same type of element. Elements in figures with a like number and different suffixes are collectively referenced in the description using just the like number.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN) by wireless means. As used herein, the term "UE" may be referred to interchangeably as an "access terminal" or "AT," a "wireless device," a "wireless terminal," a "subscriber device," a "subscriber terminal," a "subscriber station," a "user terminal" or UT, a "mobile terminal," a "mobile station," a "mobile device," and variations thereof. An "NB-IoT UE" is a UE capable of communicating over narrowband frequencies.

Generally, UEs can communicate with a core network via the RAN, and through the core network the UEs can be connected with external networks such as the Internet and with external clients via these external networks. Of course, other mechanisms of connecting to the core network and/or the Internet are also possible for the UEs, such as over wired access networks, WiFi networks (e.g., based on the Institute of Electrical and Electronics Engineers (IEEE) 802.11 specification, etc.) and so on. UEs can be embodied by any of a number of types of devices including but not limited to printed circuit (PC) cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a communications system 100 in accordance with an aspect of the disclosure. The communications system 100 contains UEs 1 . . . N. The UEs 1 . . . N can include cellular telephones, smartphones, tablet computers, personal digital assistant (PDAs), pagers, a laptop computer, a desktop computer, navigation devices, Internet of Things (IoT) devices, wearable devices (e.g., "smart" watches), and so on.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Enhanced High Rate Packet Data (eHRPD), Global System for Mobile communications (GSM), Enhanced Data rates for GSM Evolution (EDGE), Wideband CDMA (WCDMA), LTE, etc.), while the air interface 108 can comply with a short range wireless protocol (e.g., IEEE 802.11). The RAN 120 includes a plurality of access points that serve UEs over air interfaces, such as the air interfaces 104 and 106. The access points in the RAN 120 can be referred to as "access nodes" or "ANs," "access points" or "APs," "base stations" or "BSs," "Node Bs," "eNodeBs" or "eNBs," "New Radio NodeBs" or "gNBs," and so on. These access points can be terrestrial access points (or ground stations), or satellite access points. The RAN 120 is configured to connect to a core network 140 that can perform a variety of functions, including connecting circuit switched (CS) and/or packet switched (PS) calls or sessions between UEs served by the RAN 120 and other UEs served by the RAN 120 or a different RAN altogether, and can also mediate an exchange of voice, data and/or other media between UEs served by the RAN 120 and other UEs and external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to connect packet-switched voice and data communications between UE N and UEs 1 . . . N via the core network 140. Also shown in FIG. 1 is the access point 125 that is separate from the RAN 120. The access point 125 may be connected to the Internet 175 independently of the core network 140 (e.g., via an optical communication system such as FiOS, a cable modem, etc.). The air interface 108 may serve UE 4 or UE 5 over a local wireless connection, such as IEEE 802.11 in an example.

Referring to FIG. 1, a location server 170 is shown as connected to the Internet 175, the core network 140, or both. The location server 170 can be implemented as a plurality of structurally separate servers, or alternately may correspond to a single server. As will be described below in more detail, the location server 170 is configured to support one or more location services for UEs that can connect to the location server 170 via the core network 140 and/or the Internet 175.

Figure 2A:
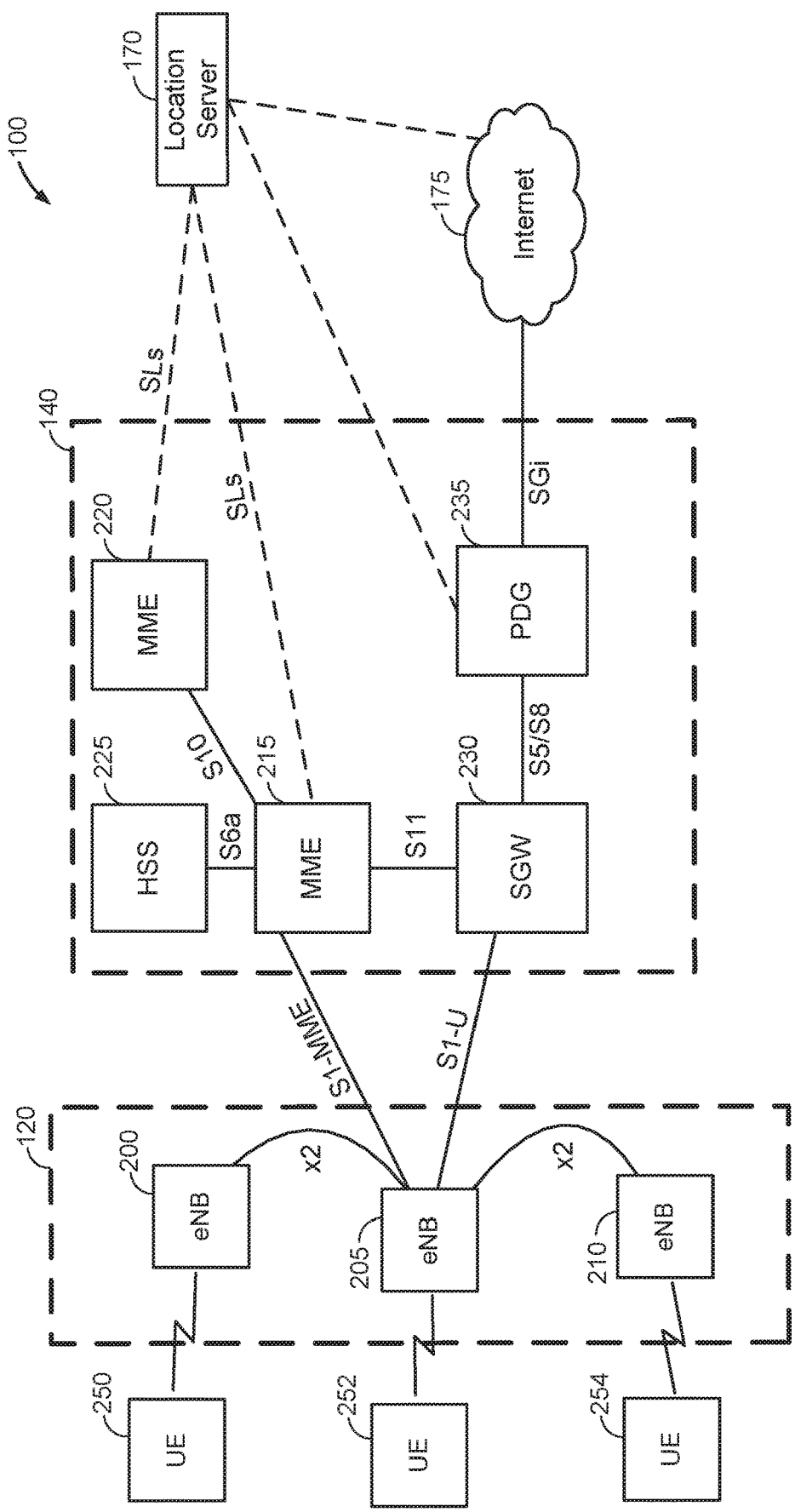
FIG. 2A illustrates an example configuration of a Radio Access Network (RAN) and a portion of a core network that is based on an Evolved Packet System (EPS) or Long-Term Evolution (LTE) network in accordance with an aspect of the disclosure.

FIG. 2A illustrates an example configuration of the RAN 120 and a portion of the core network 140 of the communications system 100 based on an Evolved Packet System (EPS) or LTE network, in accordance with an aspect of the disclosure. Referring to FIG. 2A, the RAN 120 in the EPS/LTE network is configured with a plurality of eNodeBs 200, 205, and 210, which support LTE wireless access on air interface 104 and/or 106. In FIG. 2A, the core network 140 includes a plurality of Mobility Management Entities (MMEs) 215 and 220, a Home Subscriber Server (HSS) 225, a Serving Gateway (SGW) 230 and a Packet Data Network Gateway (PDG) 235. Network interfaces between these components, the RAN 120, the location server 170 and the Internet 175 are illustrated in FIG. 2A and are defined in Table 2 (below) as follows:

TABLE 1

EPS/LTE Core Network Connection Definitions

| Network Interface | Description |
| --- | --- |
| S1-MME | Reference point for the control plane protocol between RAN 120 and MME 215. |
| S1-U | Reference point between RAN 120 and SGW 230 for the per bearer user plane tunneling and inter-eNodeB path switching during handover. |
| S5 | Provides user plane tunneling and tunnel management between SGW 230 and PDG 235. It is used for SGW relocation due to UE mobility and if the SGW 230 needs to connect to a non-collocated PDG for the required Packet Data Network (PDN) connectivity. |
| S6a | Enables transfer of subscription and authentication data for authenticating/authorizing user access to the evolved system (Authentication, Authorization, and Accounting (AAA) interface) between MME 215 and HSS 225. |
| S8 | Inter-PLMN reference point providing user and control plane between the SGW 230 in a Visited Public Land Mobile Network (VPLMN) and the PDG 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the PDG 235 and a packet |

TABLE 1-continued

EPS/LTE Core Network Connection Definitions

| Network Interface | Description |
|---|---|
| | data network, shown in FIG. 2A as the Internet 175. The packet data network may be an operator external public or private packet data network or an intra-operator packet data network (e.g., for provision of Internet Protocol (IP) Multimedia Subsystem (IMS) services). |
| SLs | Interface between an MME and the location server 170 in the event that location server 170 is or contains an Enhanced Serving Mobile Location Center (E-SMLC) |
| X2 | Reference point between two different eNodeBs used for UE handoffs. |

A high-level description of the components shown in FIG. 2A will now be provided. However, these components are each well-known in the art from various 3GPP Technical Specifications (TSs), such as TS 23.401, and the description contained herein is not intended to be an exhaustive description of all functionalities performed by these components.

Referring to FIG. 2A, the eNodeBs 200, 205, and 210 are configured to provide LTE and/or NB-IoT radio access to UEs (e.g., any of UEs 250, 252, and 254) and to provide signaling and voice/data connectivity between any UE and elements in core network 140, such as MME 215 and SGW 230. The eNodeBs 200, 205, and 210 may also be configured to broadcast PRS to nearby UEs to enable any UE to make measurements of PRS timing differences between pairs of eNodeBs and thereby enable a location estimate of the UE to be obtained by the UE itself or by a location server (e.g., location server 170) to which the timing difference measurements may be sent using OTDOA positioning.

The term "location estimate" is used herein to refer to an estimate of a location for a UE (e.g., any of UEs 250, 252, and 254), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A location estimate may also be referred to as a "location," a "position," a "fix," a "position fix," a "location fix," a "position estimate," a "fix estimate," or the like. The means of obtaining a location estimate may be referred to generically as "positioning," "locating," "position fixing," or the like. A particular solution for obtaining a location estimate may be referred to as a "location solution" or the like. A particular method for obtaining a location estimate as part of a location solution may be referred to as a "position method," a "positioning method," or the like.

Referring to FIG. 2A, the MMEs 215, and 220 are configured to support network attachment of UEs (e.g., UEs 250, 252, and 254), mobility of UEs, and bearer assignment to UEs. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2A, the SGW 230 is the gateway that terminates the user plane interface toward the RAN 120. For each UE attached to the core network 140 for an EPS-based system, at a given point of time, there may be a single SGW. The functions of the SGW 230 include: mobility anchor point, packet routing and forwarding, and transport level packet marking in the uplink and the downlink (e.g., setting the DiffServ Code Point (DSCP) based on a Quality of Service (QoS) Class Identifier (QCI) of an associated EPS bearer).

Referring to FIG. 2A, the PDG 235 is the gateway that terminates the SGi user plane interface toward the PDN, e.g., the Internet 175. If a UE is accessing multiple PDNs, there may be more than one PDG for that UE. PDG 235 functions include: packet filtering (e.g., using deep packet inspection), UE IP address allocation, transport level packet marking in the uplink and downlink (e.g., setting the DSCP based on the QCI of an associated EPS bearer), accounting for inter operator charging, uplink (UL) and downlink (DL) bearer binding, UL and DL rate enforcement and service level rate enforcement, and UL bearer binding. The PDG 235 may provide PDN connectivity to both GSM/EDGE Radio Access Network (GERAN)/Universal Terrestrial Radio Access Network (UTRAN)-only UEs, and Enhanced UTRAN (E-UTRAN)-capable UEs using any of E-UTRAN, GERAN, or UTRAN. The PDG 235 may provide PDN connectivity to E-UTRAN-capable UEs using E-UTRAN only over the S5/S8 interface.

In FIG. 2A, the location server 170 is shown as connected to one or more of the Internet 175, the PDG 235, MME 220, and MME 215. The connections to MME 215 and MME 220 are applicable when location server 170 is or contains an E-SMLC. The connections to the Internet 175 and/or to the PDG 235 are applicable when location server 170 is or contains an SLP, such a Home SLP (H-SLP), Emergency SLP (E-SLP), or Discovered SLP (D-SLP). Location server 170 may be used (i) to obtain a location for any of UEs 250, 252, and 254 (e.g., from signal measurements obtained and transferred by any of UEs 250, 252, and 254) and/or (ii) to provide assistance data to any of UEs 250, 252, and 254 to enable any of UEs 250, 252, and 254 to acquire and measure signals (e.g., signals from one or more of eNodeBs 200, 205, and 210) and, in some cases, compute a location from these signal measurements. Examples of assistance data can be orbital and timing data for Global Positioning System (GPS) or other Global Navigation Satellite System (GNSS) satellites when GPS or GNSS positioning is used, or information concerning downlink transmission from eNodeBs nearby to a UE (e.g., any of eNodeBs 200, 205, and 210) when OTDOA is used for positioning.

It should be noted that core network 140, RAN 120, and location server 170 in FIG. 2A may correspond, respectively, to core network 140, RAN 120, and location server 170 in FIG. 1. In addition, UEs 250, 252, and 254 in FIG. 2A may each correspond to any of UEs 1 to N in FIG. 1.

Figure 2B:
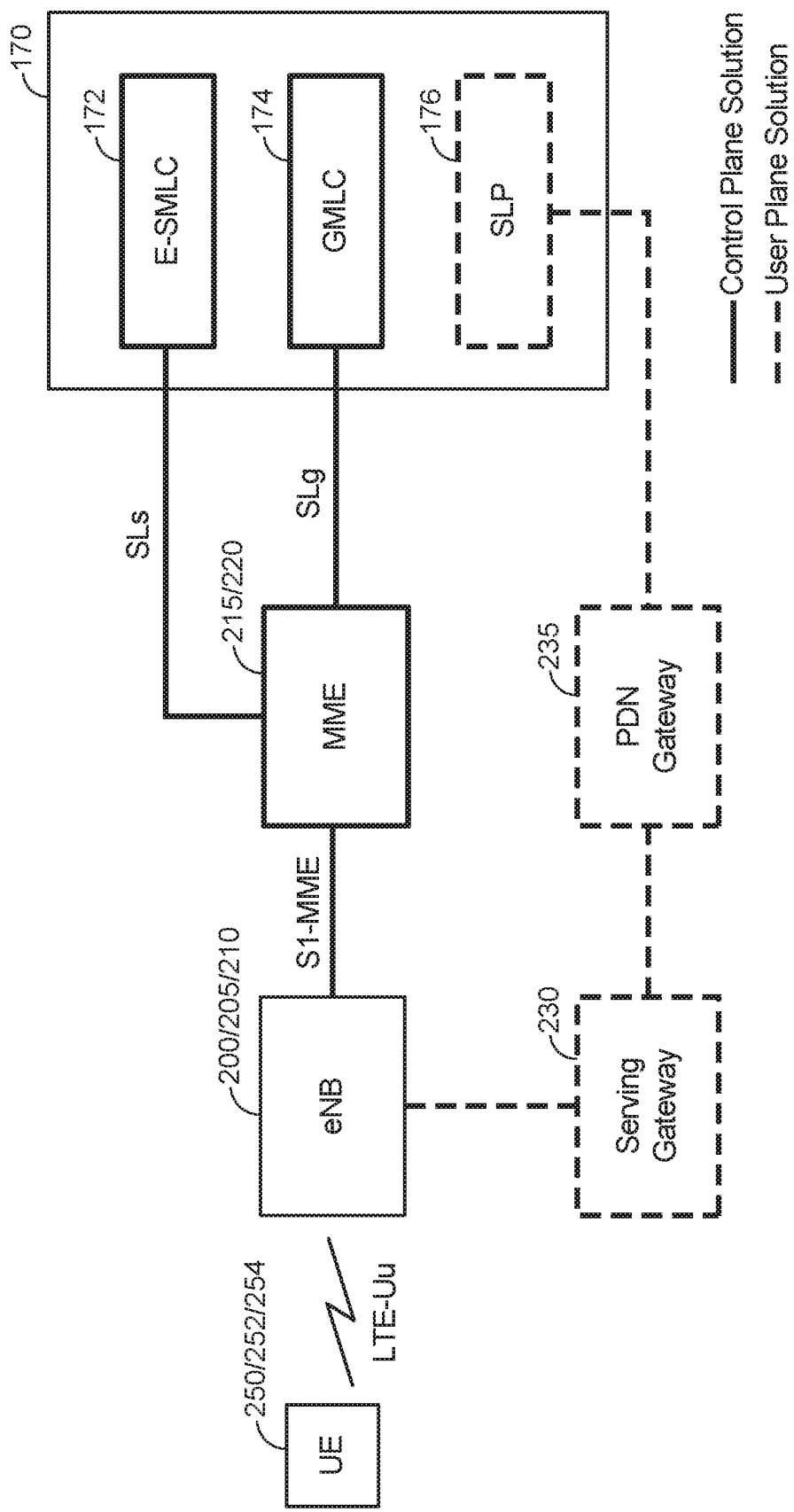
FIG. 2B is a high-level diagram showing additional features of the communication system discussed with reference to FIG. 2A.

FIG. 2B is a high-level diagram showing additional features of the communications system 100 discussed above with reference to FIG. 2A. For example, as illustrated in FIG. 2B, the location server 170 may include an E-SMLC 172, a Gateway Mobile Location Center (GMLC) 174, and an SLP 176. FIG. 2B also illustrates the type of communications between various components. For example, communications between the eNodeB 200/205/210, the SGW 230, the PDG 235, and the SLP 176 may support a user plane location solution, while communications between the eNodeB 200/205/210, the MME 215/220, and the E-SMLC 172 and/or the GMLC 174 may support a control plane location solution.

As discussed above, to locate a UE (e.g., UE 250, 252, and/or 254) geographically, there are several approaches. This disclosure utilizes the Observed Time Difference Of Arrival (OTDOA) positioning method which is defined by the 3rd Generation Partnership Project (3GPP) (e.g., in 3GPP Technical Specification (TS) 36.355) for wireless networks that provide wireless access using LTE. OTDOA is a multilateration method in which the UE measures the time difference, known as a Reference Signal Time Difference (RSTD), between specific reference signals (e.g., PRS) from different pairs of eNodeBs and either reports these time differences to a location server, such as the E-SMLC 172 or SLP 176, or computes a location itself from these time differences.

Generally, RSTDs are measured between a reference cell and one or more neighbor cells. The reference cell remains the same for all RSTDs measured by a UE for any single positioning use of OTDOA and would typically correspond to the serving cell for the UE or another nearby cell with good signal strength at the UE. The neighbor cells would normally be supported by eNodeBs different from the eNodeB for the reference cell and may have good or poor signal strength at the UE. The location computation can be based on the measured time differences (e.g., RSTDs) and knowledge of the eNodeBs' locations and relative transmission timing (e.g., regarding whether eNodeBs are accurately synchronized or whether each eNodeB transmits with some known time difference relative to other eNodeBs).

When a UE obtains a location estimate itself using OTDOA measured time differences, the necessary additional data (e.g., eNodeBs' locations and relative transmission timing) may be provided to the UE by a location server (e.g., E-SMLC 172 or SLP 176). In some implementations, a location estimate for a UE may be obtained (e.g., by the UE itself or by a location server) from OTDOA measured time differences and from other measurements made by the UE (e.g., measurements of signal timing from GPS or other GNSS satellites). In these implementations, known as hybrid positioning, the OTDOA measurements may contribute towards obtaining a UE location estimate but may not wholly determine the location estimate.

Referring to FIG. 2A, a typical positioning signaling flow may start with the MME 215/220 initiating a location service or receiving a location service request from the UE 250/252/254 or GMLC 174. The GMLC 174 is the first node with which an external Location Based Service (LBS) client communicates. The MME 215/220 sends a positioning request to the location server 170, specifically, the E-SMLC 172. The E-SMLC 172 processes the request, communicates with the UE 250/252/254, and requests RSTD measurements from the UE 250/252/254. Upon receiving RSTD measurements from the UE 250/252/254, the E-SMLC 172 estimates the position of the UE 250/252/254 and sends the result back to the MME 215/220. The MME 215/220 may further forward the result to the UE 250/252/254 or the GMLC 174 as appropriate.

Figure 3A:
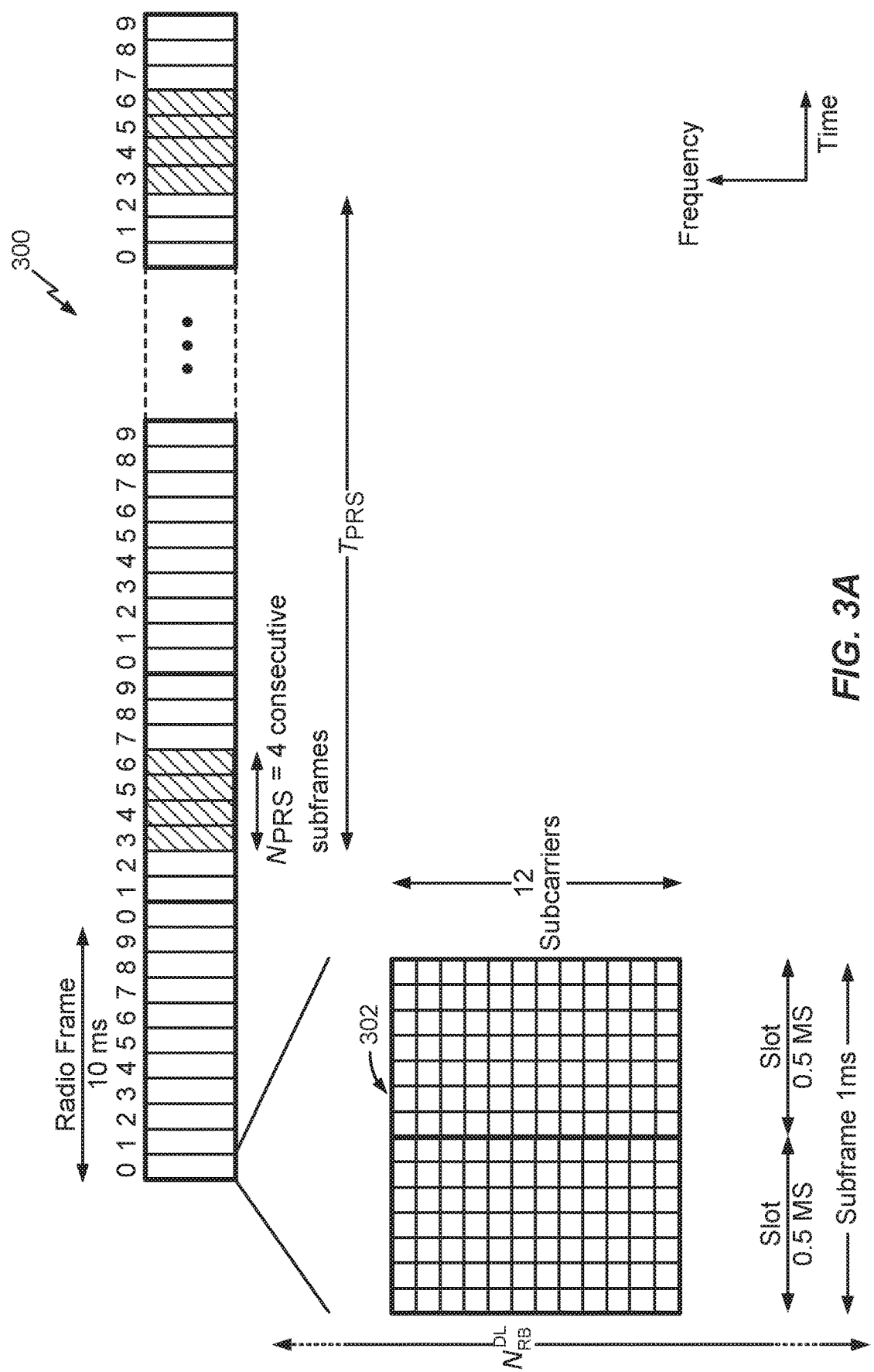
FIG. 3A illustrates an exemplary positioning reference signal (PRS) transmission schedule.

As noted above, a UE measures the time difference (i.e., RSTD) between PRS transmitted by different pairs of eNodeBs. In order for a UE to measure the PRS transmitted by different pairs of eNodeBs, eNodeBs periodically transmit sequences of PRS that the UE is configured to measure. FIG. 3A illustrates an exemplary frame structure 300 in LTE and 5G NR. As illustrated in FIG. 3A, in the time domain, a radio frame having a length of 10 milliseconds (ms) is composed of 10 subframes having a length of 1 ms each. Each subframe (e.g., subframe 302) is composed of two slots having a length of 0.5 ms each. In the frequency domain, a subframe 302 is composed of 12 subcarriers, and in the time domain, a subframe 302 is composed of seven symbols. One symbol on one subcarrier is referred to as a physical resource block (PRB).

PRS are transmitted in predefined positioning subframes grouped by several consecutive subframes $N_{PRS}$, which are referred to as "positioning occasions" or "PRS occasions." Positioning occasions occur periodically with a certain periodicity $T_{PRS}$. The period $T_{PRS}$ can be 160, 320, 640, or 1280 subframes (or milliseconds), and the number of consecutive subframes NPRS can be one, two, four, or six subframes. Each eNodeB can configure a subframe offset, which defines the starting subframe for PRS transmission relative to the start of a system frame cycle. FIG. 3A shows an example of positioning occasions with $N_{PRS}$=4 subframes, separated by $T_{PRS}$ subframes.

The PRS sequence is a pseudo-random Quadrature Phase Shift Keying (QPSK) sequence. The parameter used to initialize a PRS sequence depends on the orthogonal frequency-division multiplexing (OFDM) symbol index, slot index, and physical cell identity. As such, the sequence varies with the OFDM symbol index, slot index, and physical cell identity. Given an initialization parameter, a PRS sequence can be generated. The complex-valued QPSK elements of the sequence are then mapped to resource elements determined by physical cell identity. The overall time-frequency PRS mapping pattern is a diagonal pattern, as illustrated in FIG. 3B.

Figure 3B:
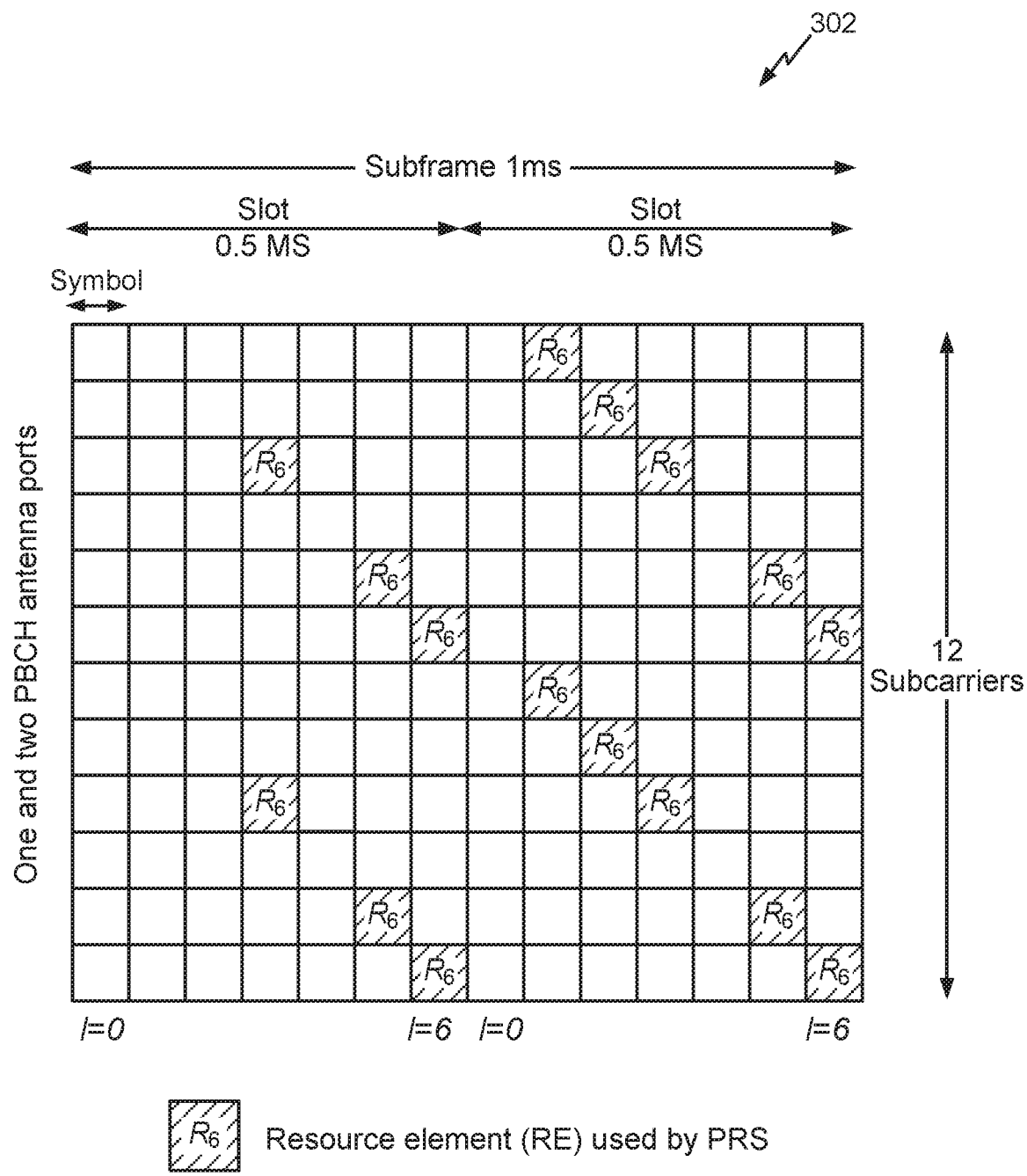
FIG. 3B illustrates a Physical Resource Block (PRB) having a PRS mapping pattern of in-band PRS for one and two Physical Broadcast Channel (PBCH) antenna ports.

FIG. 3B illustrates a subframe 302 having a PRS mapping pattern of in-band PRS for one and two Physical Broadcast Channel (PBCH) antenna ports. The subframe 302 may be a subframe in LTE or 5G NR. As illustrated in FIG. 3B, subframe 302 has a length of one subframe (which may have a length of 1 ms) that is divided into two slots (which may have a length of 0.5 ms). Each slot is composed of seven OFDM symbols (l=0 to 6) in the time domain and 12 subcarriers in the frequency domain. As noted above, one OFDM symbol on one subcarrier is referred to as a PRB. A PRB is also referred to as a resource element (RE).

An important design feature of PRS signals in LTE is that PRS has a frequency reuse factor of six. A frequency reuse factor of six means that there are six distinct pairs of frequency tones that can be used as PRS in each OFDM symbol (e.g., {0, 6}, {1,7}, . . . , {5,11}). Some OFDM symbols may share the same tone-pairs. As such, referring to FIG. 3B, the OFDM symbol index (l) may have a value from 0 to 6, and each resource block (e.g., PRB 302) may consist of 12 subcarriers with a subcarrier spacing of 15 kHz. As shown in FIG. 3B, only two of the 12 resource elements per symbol index are used by PRS. By shifting the mapping in frequency, a total of six orthogonal PRS mappings are possible. The specific frequency shift is cell specific and is based on the physical cell identity. Repeating the sequence generation and mapping, PRS sequences are generated as the time (i.e., OFDM symbol index and slot index) varies, with each sequence mapped in frequency to the corresponding resource elements. Note that the first three OFDM symbols in a subframe are not used by PRS signals since they may be used by other LTE signals, such as the Physical Downlink Control Channel (PDCCH). The other OFDM symbols not used by PRS can be used by LTE Cell-specific Reference Signals (CRS).

A prominent IoT Machine Type Communication (MTC) technology is the Narrowband IoT (NB-IoT) protocol. NB-IoT is designed to provide for low-cost devices, high coverage, long device battery life (more than ten years), and massive capacity. The maximum carrier bandwidth in NB-IoT is 200 KHz, with a usable bandwidth of 180 KHz (i.e., one LTE resource block (RB)). PRS in NB-IoT are referred to as Narrowband Positioning Reference Signals (NPRS).

As used herein, the term "PRS" may refer to either or both PRS and NPRS, depending on the context.

Figure 4:
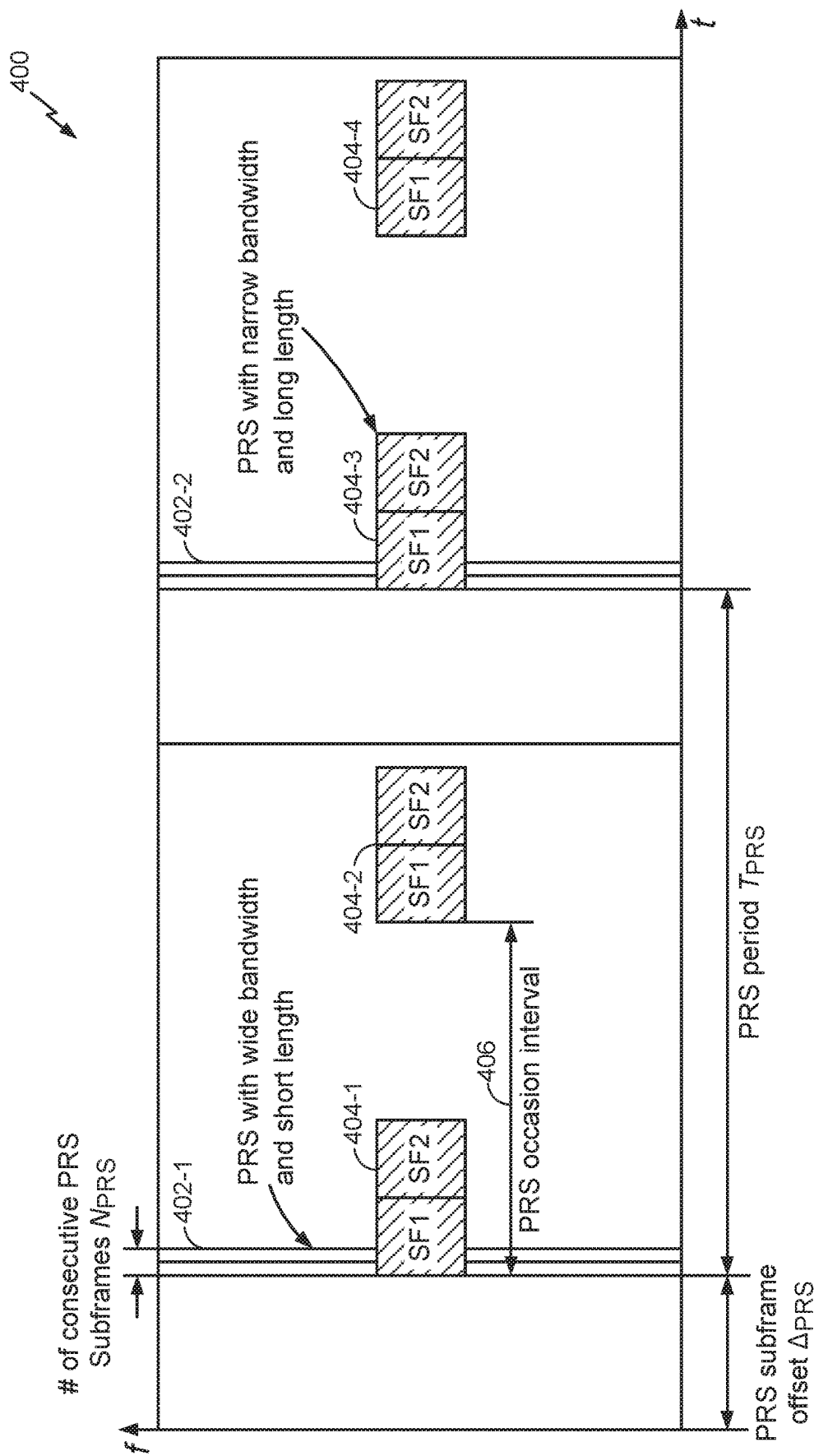
FIG. 4 illustrates example PRS configurations for support of OTDOA within a single cell or within a plurality of associated cells.

FIG. 4 illustrates example PRS configurations 400 for support of OTDOA within a single cell or within a plurality of associated cells. PRS configurations 400 in FIG. 4 may be based, at least in part, on PRS transmission for LTE as defined in 3GPP TS 36.211. A single cell may comprise a single narrow bandwidth cell supporting 200 KHz carrier bandwidth. A plurality of associated cells may comprise one or more narrow bandwidth cells each supporting 200 KHz carrier bandwidth, where all the associated cells in the plurality use the same carrier frequency, are supported by the same eNodeB, and have approximately the same coverage areas (e.g., share a common geographic coverage area), and where each narrow bandwidth cell may have an additional frequency offset. A plurality of two or more associated cells as just described is referred to herein as a "cell set." In terms of supporting OTDOA, this means that a single reference cell or a single neighbor cell may be replaced by two or more associated cells and is then referred to herein as a "reference cell set" or "neighbor cell set," in each case respectively. It is noted that in case of supporting the PRS configurations shown in FIG. 4 and described below, a single reference cell or a single neighbor cell would need to support at least 10 MHz carrier bandwidth, whereas a reference cell set or neighbor cell set would need to include one wide bandwidth cell supporting at least 10 MHz carrier bandwidth.

PRS configurations 400 in FIG. 4 comprise a number of PRS positioning occasions for two different PRS carrier bandwidth values –10 MHz and 200 KHz. Each PRS positioning occasion in the example of FIG. 4 comprises consecutive LTE subframes (e.g., "SF1," "SF2") and occurs at different fixed periodic intervals. The series of LTE subframes (referred to herein as PRS subframes) containing PRS signals that are transmitted for the cell or cell set are represented horizontally in FIG. 4, with later subframes shown to the right of earlier subframes. The PRS bandwidth for each PRS subframe is represented vertically in FIG. 4 with higher PRS bandwidth occupying greater vertical extent.

PRS configurations 400 include a series of PRS positioning occasions. A first PRS positioning occasion 406 includes a number ($N_{PRS}$) of consecutive PRS subframes 402-1 (e.g., two) that have 10 MHz PRS carrier bandwidth and fixed PRS periodicity $T_{PRS}$. PRS configuration 400 further includes a number ($N_{PRS}$) of consecutive PRS subframes 404-1 (e.g., two) that have 200 KHz PRS carrier bandwidth and a fixed periodicity. At the end of the first PRS positioning occasion 406, but before the end of the PRS period $T_{PRS}$, there is a subsequent set of PRS subframes 404-2 that have 200 KHz PRS carrier bandwidth. At the end of the PRS period $T_{PRS}$, the sequence repeats, with a second sequence of consecutive PRS subframes 402-2 and a third and fourth sequence of consecutive PRS subframes 404-3 and 404-4, respectively.

For simplicity, FIG. 4 only shows a few PRS positioning occasions transmitted by the cell or cell set over any complete sequence of 1024 LTE system frames. Additional PRS positioning occasions not shown in FIG. 4 may be present that could be represented to the left and/or right of FIG. 4 if additional space were available.

It should be noted that for PRS configurations 400, 10 MHz PRS carrier bandwidth may correspond to 9 MHz of usable (occupied) PRS bandwidth, and 200 KHz PRS carrier bandwidth may correspond to 180 KHz of usable (occupied) PRS bandwidth. A UE (e.g., UE 250) and location server (e.g., location server 170) may then refer to the PRS bandwidth using either the PRS carrier bandwidth or the PRS usable bandwidth.

In the example in FIG. 4, PRS configuration parameters for each of the PRS configurations 400 include the PRS bandwidth, the periodicity of consecutive PRS positioning occasions, the number of consecutive PRS subframes in each PRS positioning occasion (which is two in each case in this example), and the subframe offset of the first PRS positioning occasion for each PRS configuration. Other PRS configuration parameters not explicitly shown in FIG. 4 could include one or more of the radio frame offset, a PRS code sequence, a PRS frequency shift, a PRS muting pattern, and a PRS direction of transmission (e.g., when a PRS is beamformed by an eNodeB in a particular direction using a multiple antenna array).

For NB-IoT, NPRS is configured per NB-IoT carrier transmitting NPRS. Each NB-IoT carrier can have different configuration parameters, Part A and Part B. The network (e.g., location server 170) can configure NPRS using only Part A, only Part B, or both.

Part A uses a bitmap to indicate the NPRS subframes in one NPRS positioning occasion. The value of each bit indicates the presence of NPRS in the corresponding subframe. The length of the NPRS bitmap is the same length as the bitmap of valid subframe configurations in LTE (i.e., 10 or 40 bits). The bitmap of valid subframe configurations allows the network to reserve some subframes for other purposes, and the set of subframes that are indicated invalid are not used for transmission to NB-IoT UEs. Since legacy NB-IoT UEs do not understand NPRS transmissions, the subframes containing NPRS are marked as invalid downlink subframes in the bitmap of valid subframe configuration.

In contrast with the existing LTE PRS transmission schedule, the NPRS subframes indicated with Part A occur in every radio frame without any long-term periodicity. Likewise, the length of the NPRS bitmap may be considered as the period of NPRS positioning occasions. Each NPRS period can be regarded as a positioning occasion, and the subframes used for NPRS are indicated in the NPRS bitmap. With this indication, the NPRS subframes in a positioning occasion need not be consecutive, while the PRS subframes of a positioning occasion in LTE are always consecutive.

Part B is similar to LTE PRS and specifies the periodicity of positioning occasions, the number of consecutive NPRS subframes in a positioning occasion, and the NPRS subframe offset. Unlike Part A, NPRS subframes indicated with Part B do not have to be invalid subframes. The periodicity of NPRS occasion is still 160, 320, 640, or 1280, but the size of the NPRS subframe offset is limited to reduce the overhead of the LPP assistance data transfer. Specifically, for a given periodicity $T_{PRS}$, the NPRS subframe offset is $a*T_{PRS}$, where a takes the value of 0, ⅛, 2/8, ⅜, 4/8, ⅝, 6/8, or ⅞ and the number of consecutive NPRS subframes may be 10, 20, 40, 80, 160, 320, 640, or 1280. Consequently, the consecutive NPRS transmissions in a positioning occasion can be much longer than their counterparts in both LTE and LTE-M OTDOA. This longer NPRS transmission partially compensates for the reduced bandwidth of NPRS.

As noted above, Part A and Part B may both be configured. In that case, a subframe contains NPRS if both parts of the configuration indicate that the subframe contains NPRS.

3GPP TS 36.211 Release 14 introduced an OTDOA-based positioning for NB-IoT that specifies that an NB-IOT UE be able to perform a location determination based on PRS transmitted during a single PRB (illustrated in FIG. 3), instead of PRS transmitted during consecutive subframes (as discussed with reference to FIG. 4). However, the underlying PRS sequence design in NB-IoT remains largely the same as in wideband LTE, except for some increase in the number of resource elements in the guardband/standalone deployment.

Because of using only a single PRB transmission to calculate location, NB-IoT positioning generally suffers from poor accuracy due to insufficient processing gain. More specifically, NB-IoT utilizes only 14 to 28 resource elements for in-band/guardband/standalone, whereas LTE (operating at 20 MHz) utilizes 1400 resource elements, making it more difficult for the NB-IoT UE to calculate the appropriate gain for the PRS measurements. As such, it can take up to 320 NPRS subframes to achieve RSTD accuracy of approximately 20 time units (Ts) in normal coverage areas for non-colliding PRS. Further, the poor cross-correlation property due to the short PRS sequence length also makes the NB-IoT UE vulnerable to detecting false peaks from colliding PRS, even after observing a large number of NPRS subframes, as the false peak magnitude decreases exponentially with the length of the PRS sequence.

A false peak from a PRS collision can occur when, for example, an NB-IoT UE measures the received time of a PRS from a first cell "A" that transmits a first PRS sequence "A," and the received time of a PRS from a second cell "B" that transmits a second PRS sequence "B" on the same resource element (RE). When the PRS sequence length is long, cross-correlation between the first and second sequences A and B is much weaker than the auto-correlation of sequence A, for example, alone. Therefore, correlating received PRS tones with the first sequence A, the NB-IoT will be able to detect the first cell's timing correctly from the strongest peak. When the PRS sequence length is short, however, cross correlation between the first and second sequences A and B is comparable to the auto-correlation of sequence A. Under noisy conditions, there is a chance that a peak with incorrect timing from cross-correlation of sequences A and B could appear stronger than the legitimate peak from the auto-correlation of sequence A. In such a case, the NB-IoT UE will mistakenly consider such a false peak as the correct one, and will end up with the incorrect received time estimate. Because of these issues, the colliding PRS scenario suffers from an approximately 15 to 20 Ts worse RSTD accuracy than the non-colliding PRS scenario for the same Signal-to-Interference-Plus-Noise-Ratio (SINR) conditions due to false peaks.

FIG. 5 illustrates a comparison between the colliding and non-colliding PRS scenarios for different coverages. Table 502 illustrates colliding and non-colliding PRS scenarios for "normal" coverage, e.g., a SINR of greater than or equal to −6 dB. Table 504 illustrates colliding and non-colliding PRS scenarios for "enhanced" coverage, e.g., a SINR less than −6 dB and greater than or equal to −15 dB. These tables show the vulnerability of existing NPRS sequence design to the colliding PRS scenario (due to the poor cross-correlation property). More specifically, for the same number of NPRS subframe observations and the same effective SINR conditions, RSTD measurement accuracy is substantially worse in the colliding PRS scenario.

Currently, NPRS' are only transmitted in resource blocks for NB-IoT carriers configured for NPRS transmission. In a subframe configured for NPRS transmission, the starting positions of the OFDM symbols configured for NPRS transmission are identical to those in a subframe in which all OFDM symbols have the same cyclic prefix length as the OFDM symbols configured for NPRS transmission. NPRS are defined for Δf=15 kHz and normal cyclic prefix (CP).

Currently, the NPRS sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame, l is the OFDM symbol number within the slot, and c(i) is the pseudo-random sequence. The pseudo-random sequence generator is initialized with $c_{init} = 2^{28} \cdot \lfloor N_{ID}^{NPRS}/512 \rfloor + 2^{10} \cdot (7 \cdot (n_s+1)+l+1) \cdot (2 \cdot (N_{ID}^{NPRS} \mod 512)+1)+2 \cdot (N_{ID}^{NPRS} \mod 512)+N_{CP}$ at the start of each OFDM symbol, where $N_{ID}^{NPRS} \in \{0, 1, \ldots, 4095\}$ equals $N_{ID}^{Ncell}$ unless configured by higher layers and where $N_{CP}=1$.

The gold sequence on each OFDM symbol containing PRS is of length two (i.e., spanning two non-adjacent subcarriers per symbol of a PRB, as illustrated in FIG. 3B) due to the single PRB transmission. This leads to a poor cross-correlation property in the colliding PRS scenario. The initial seed for the PRS sequence changes every symbol, and resets every radio frame. As such, there may not be enough averaging across symbols to suppress the false peaks.

Figure 6:
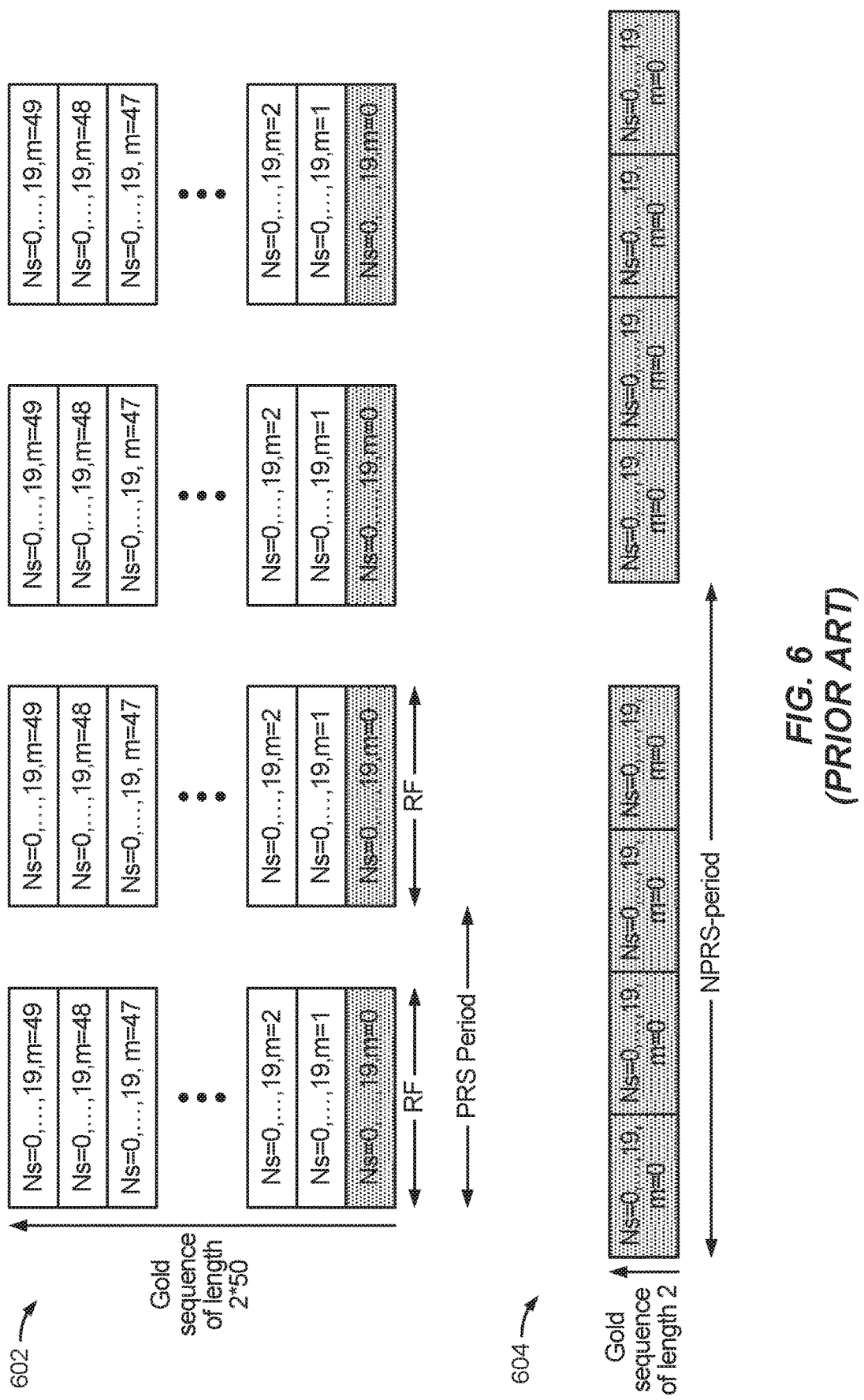
FIG. 6 illustrates differences between conventional PRS transmissions in wideband and NPRS in narrowband.

FIG. 6 illustrates differences between conventional PRS transmissions in wideband and NPRS in narrowband. Time diagram 602 illustrates an exemplary conventional wideband PRS transmission scenario that has a gold sequence of length 2×50. In the illustrated scenario, PRS are transmitted on 50 PRBs (e.g., m=0 to 49) during twenty slots (e.g., Ns=0 to 19) per PRS period. Time diagram 604 illustrates an exemplary conventional NPRS transmission scenario that has a gold sequence of length two. In the illustrated scenario, NPRS are transmitted on a single PRB (e.g., m=0) during 20 slots (e.g., Ns=0 to 19) per NPRS period. Note that one radio frame ("RF" in the figure), or 10 ms, consists of 10 subframes and 20 slots. Hence, the slot number Ns cycles from 0 to 19 over the span of 10 subframes, or one radio frame.

The present disclosure increases the effective sequence length in NPRS transmission by employing higher PRS sequence diversity across time. In particular, the PRS sequences across different radio frames can be changed when PRS is transmitted over narrowband. A false peak position from the poor cross correlation in a certain PRS sequence pair can therefore be suppressed by averaging over a large number of different PRS sequence pairs. This can be realized by resetting the slot number used for computing the initial seed ($c_{init}$) every K (e.g., greater than one) radio frames. The actual NPRS sequence periodicity can be configurable/signaled to the narrowband-capable UE as a part of PRS configuration. Specifically, in the equation $c_{init} = 2^{28} \cdot \lfloor N_{ID}^{NPRS}/512 \rfloor + 2^{10} \cdot (7 \cdot (n_s+1)+l+1) \cdot (2 \cdot (N_{ID}^{NPRS} \mod 512)+1)+2 \cdot (N_{ID}^{NPRS} \mod 512)+N_{CP}$ the slot number ($n_s$) can be replaced by $n'_s$, given as $n'_s=n_s+20+(n_{frame} \% K)$. Note that $N_{ID}^{NPRS}$ is fixed for each cell, and only $n_s$ and l change across different slots/symbols.

Another way to implement NPRS diversity is by changing the PRB index (m) used for sequence generation at each radio frame. Specifically, in the equation $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

the PRB index (m) can be replaced by m', given as m'=m+ 2×($n_{frame}$ % K).

Figure 7:
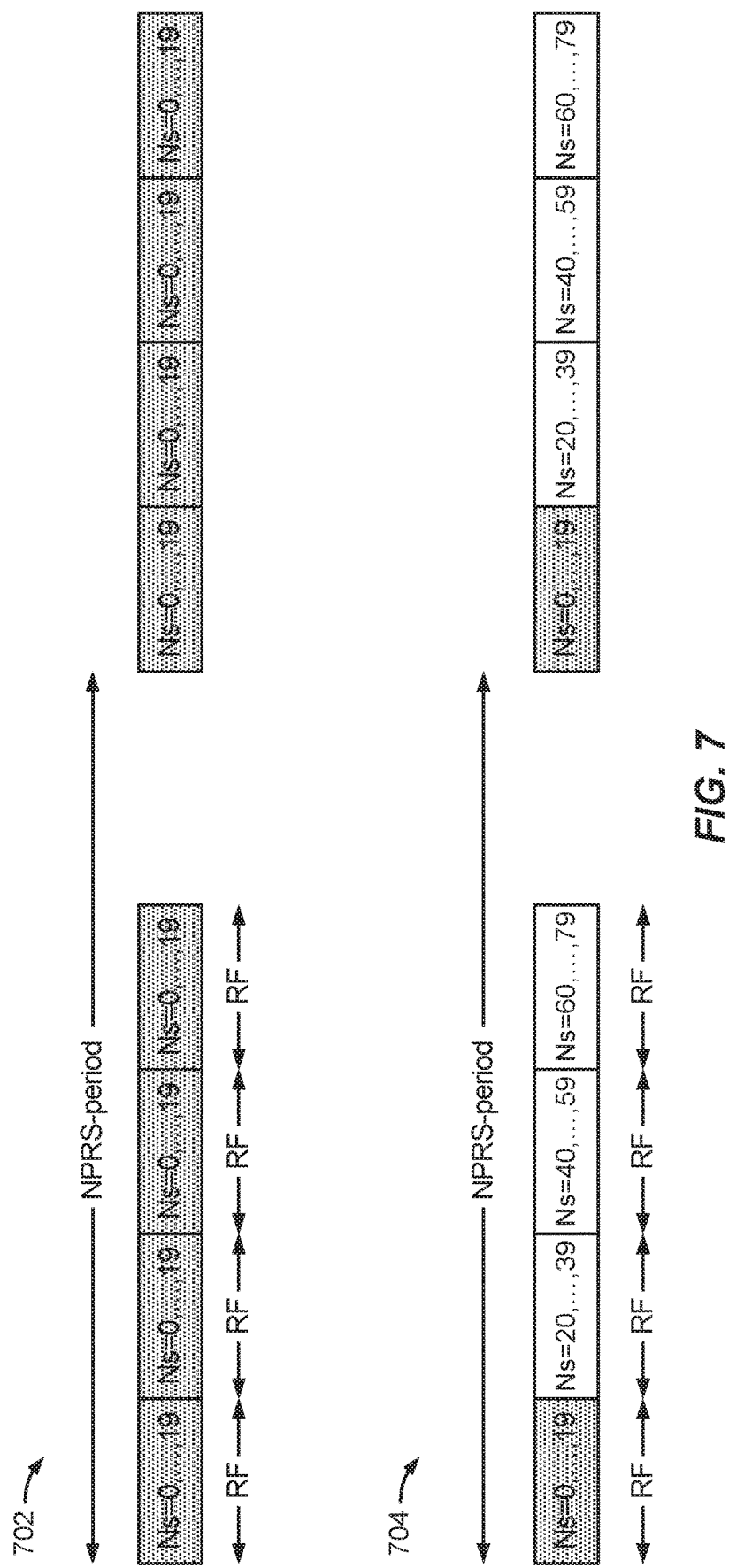
FIG. 7 illustrates an example of increasing NPRS sequence diversity using the proposed slot number extension.

FIG. 7 illustrates an example of increasing NPRS sequence diversity using the proposed slot number extension. Time diagram 702 illustrates the conventional NPRS sequencing, in which the slot number (Ns) resets every 10 ms, or every radio frame ("RF" in the figure). Note that a 10 ms time period, or one radio frame, consists of 10 subframes and 20 slots (as each subframe has a length of 1 ms and each subframe has two 0.5 ms slots). Hence, the slot number Ns cycles from 0 to 19 over the span of 10 subframes, or one radio frame, and then resets. Time diagram 704 illustrates the increased PRS sequence diversity of the present disclosure. In time diagram 704, the slot number (Ns) resets every 40 ms, rather than every 10 ms. Hence, Ns cycles from 0 to 79 (i.e., 80 slots), instead of from 0 to 19 (i.e., 20 slots), over the span of four radio frames (or 40 ms), instead of one, and then resets. Note that although FIG. 7 illustrates PRS diversity based on the slot number extension, as shown below with reference to FIG. 9, it is equally applicable to the alternative option based on the PRB index (m) extension.

Figure 8:
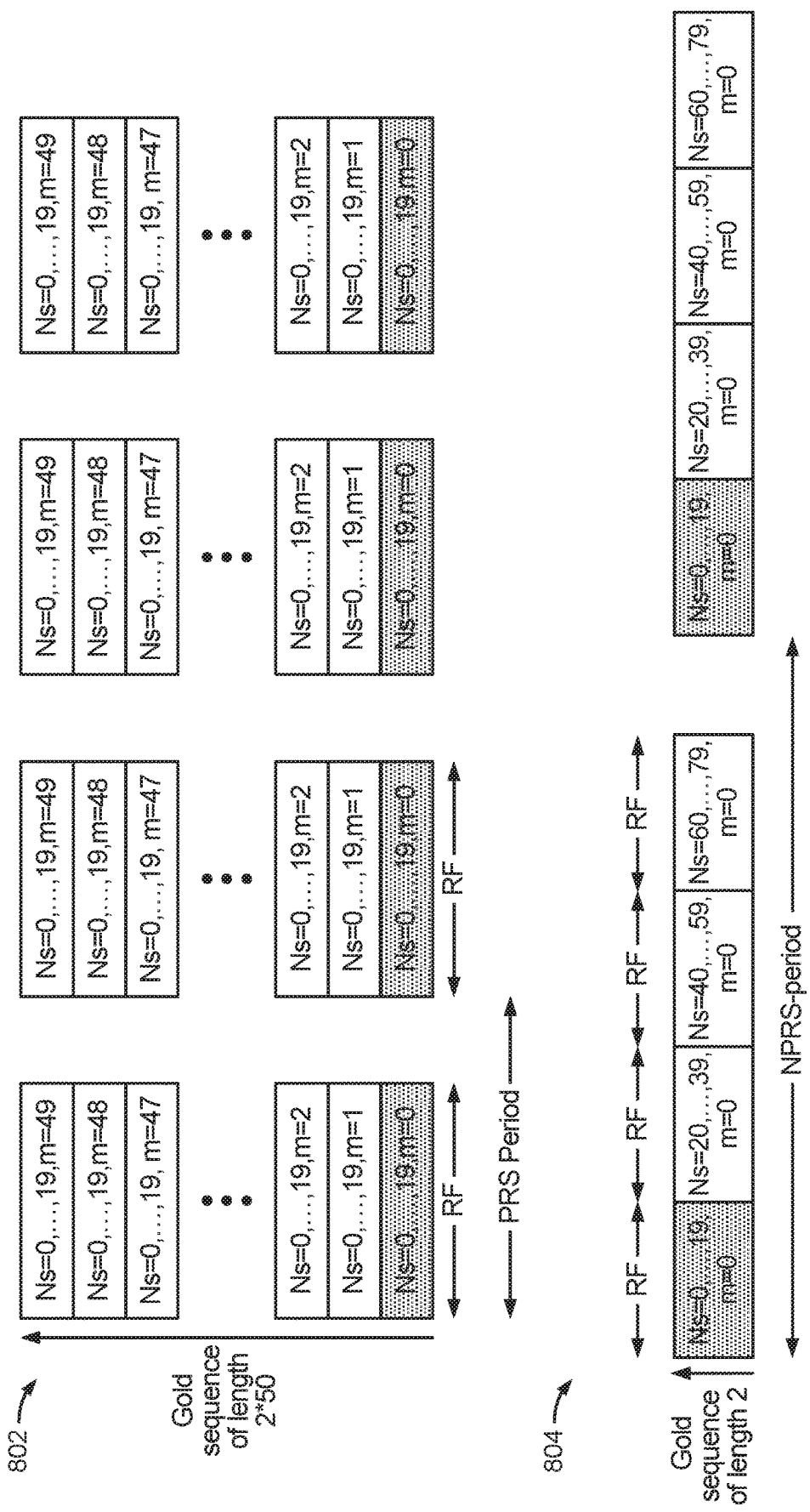
FIG. 8 illustrates the differences between conventional wideband PRS transmissions and NPRS transmissions utilizing the slot number extension disclosed herein.

FIG. 8 illustrates the differences between conventional wideband PRS transmissions and NPRS transmissions utilizing the slot number extension disclosed herein. Time diagram 802, like time diagram 602 in FIG. 6, illustrates an exemplary conventional wideband PRS transmission scenario that has a gold sequence of length 2×50. In the illustrated scenario, PRS are transmitted on 50 PRBs (e.g., m=0 to 49) during twenty slots (e.g., Ns=0 to 19). Time diagram 804 illustrates an exemplary NPRS transmission scenario according to the present disclosure that has a gold sequence of length two. In the illustrated scenario, NPRS are transmitted on a single PRB (e.g., m=0) during 80 slots (e.g., Ns=0 to 79). More specifically, as illustrated in FIG. 8, in time diagram 804, the slot number (Ns) resets every 40 ms (i.e., 40 subframes). Hence, Ns cycles from 0 to 79 (i.e., 80 slots), instead of from 0 to 19 (i.e., 20 slots), over the span of four radio frames (or 4×10 ms), instead of one, and then resets. In that way, the NPRS sequence is transmitted on different slot/symbol combinations of the same PRB. Said another way, NPRS are transmitted on the same PRB using a different NPRS sequence across different symbols/subframes/radio frames. Thus, as will be appreciated, by resetting the slot number every 40 ms instead of every 10 ms, PRS sequence diversity is achieved across the time domain.

Figure 9:
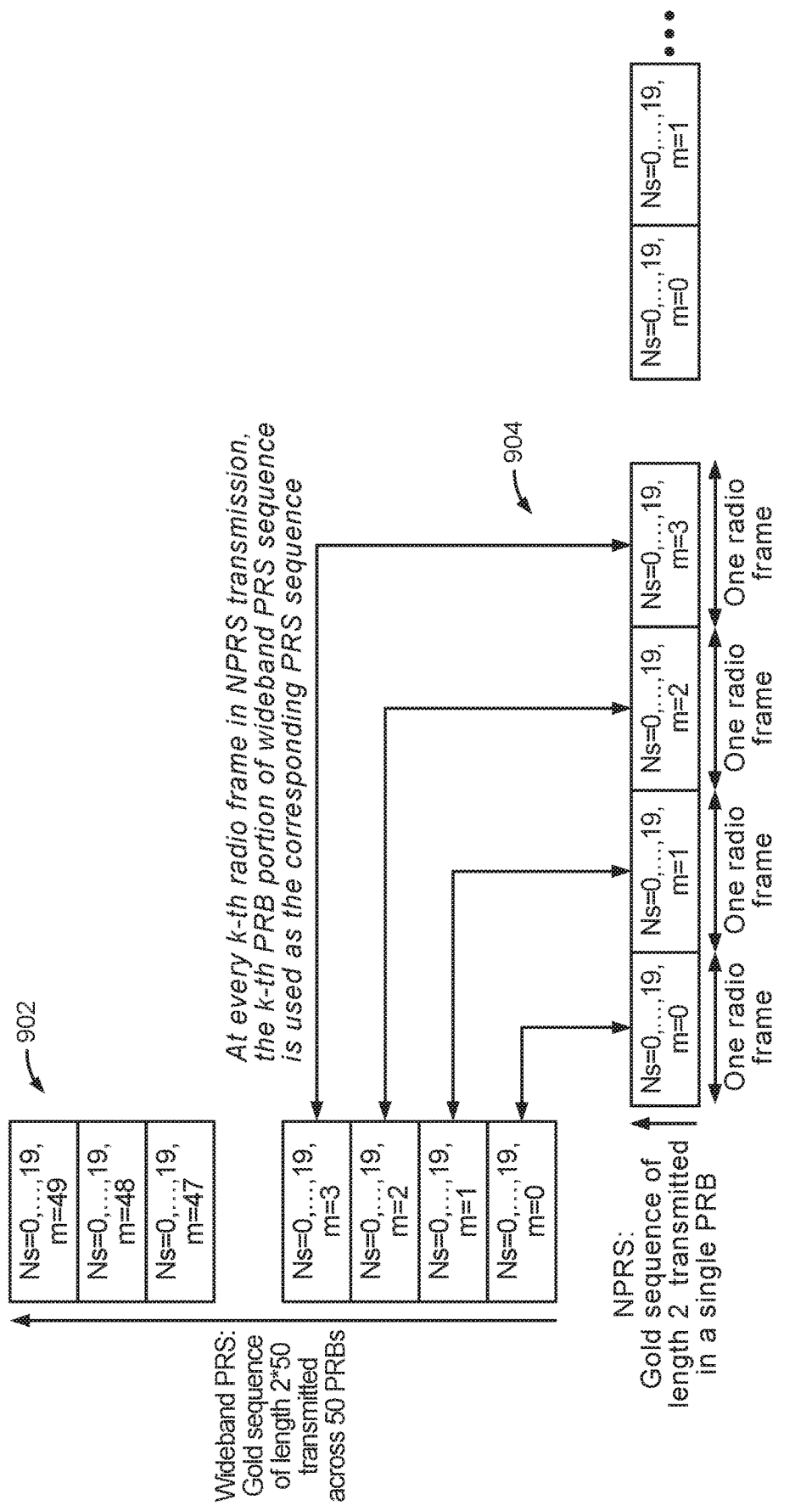
FIG. 9 illustrates exemplary NPRS transmissions utilizing a PRB index extension disclosed herein.

FIG. 9 illustrates another example of NPRS transmissions utilizing the PRB index extension disclosed herein. Time diagram 902, like time diagram 602 in FIG. 6, illustrates an exemplary conventional wideband PRS transmission scenario that has a gold sequence of length 2×50. In the illustrated scenario, PRS are transmitted on 50 PRBs (e.g., m=0 to 49) during twenty slots (e.g., Ns=0 to 19). Time diagram 904 illustrates an exemplary NPRS transmission scenario according to the present disclosure that has a gold sequence of length two. In the illustrated scenario, at every kth radio frame of the NPRS transmissions, the kth PRB portion of the wideband PRS sequence is used as the corresponding NPRS sequence. Thus, for example, during the first radio frame (having slot numbers Ns=0 to 19), the NPRS sequence is transmitted on the PRB having index m=0. During the second radio frame (that again uses slot numbers Ns=0 to 19), the NPRS sequence is transmitted on the PRB having index m=1. As illustrated in FIG. 9, in time diagram 904, the PRB index resets every four radio frames, or 40 ms. However, this is merely an example—the NPRS sequence may be longer or shorter than four radio frames. In either case, the NPRS sequence will transmitted on the PRB having the index of the corresponding wideband PRS.

Figure 10:
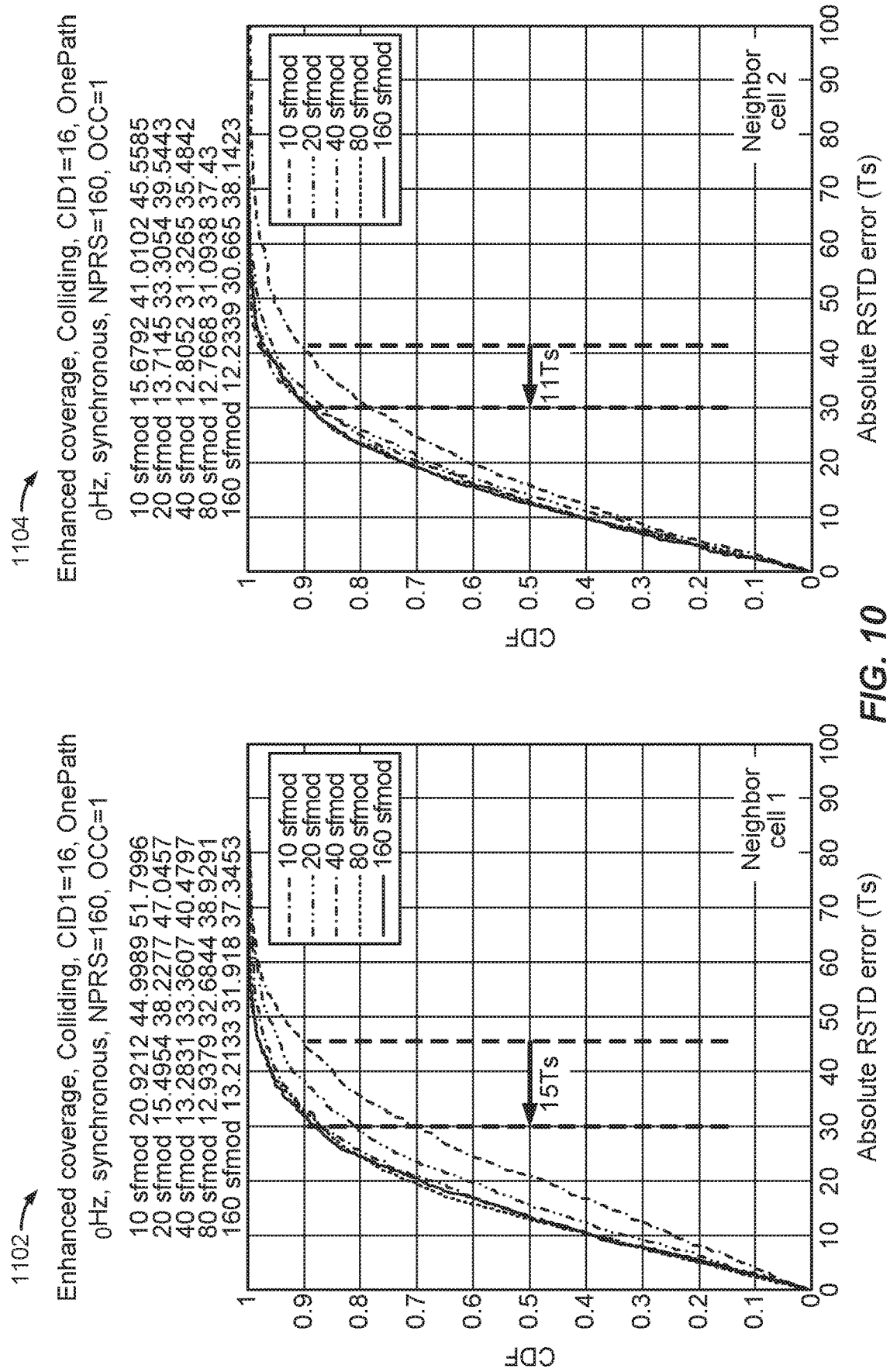
FIG. 10 illustrates exemplary simulation results of colliding PRS in "enhanced" coverage according to an aspect of the disclosure.

FIG. 10 illustrates exemplary simulation results of colliding PRS in "enhanced" coverage (e.g., a SINR less than −6 dB and greater than or equal to −15 dB) according to an aspect of the disclosure. As illustrated in graphs 1002 and 1004, a PRS sequence periodicity of 160 ms provides approximately a 15 Ts 90-percentile RSTD accuracy improvement. That is, at 90-percentile RSTD accuracy, there is a reduction from 45 Ts to 30 Ts for neighbor cell 1.

When implementing the PRS sequence diversity described herein, there may be an issue with backward compatibility with wideband PRS. For example, in the case of an in-band deployment, the NPRS could be a part of the wideband PRS transmission, which would not use the proposed longer PRS sequence periodicity. To address this issue, as a first option, the eNodeB can fall back to the legacy PRS diversity sequence at the NPRS occasion(s) coinciding with the wideband PRS occasion(s). For this solution, an NB-IoT UE supporting the proposed longer PRS sequence periodicity would be provided with both the NPRS and the wideband PRS configuration so that it can use the appropriate PRS sequence at each NPRS/PRS occasion. As a second solution, the NPRS slot number could reset at every wideband PRS occasion.

Figure 11:
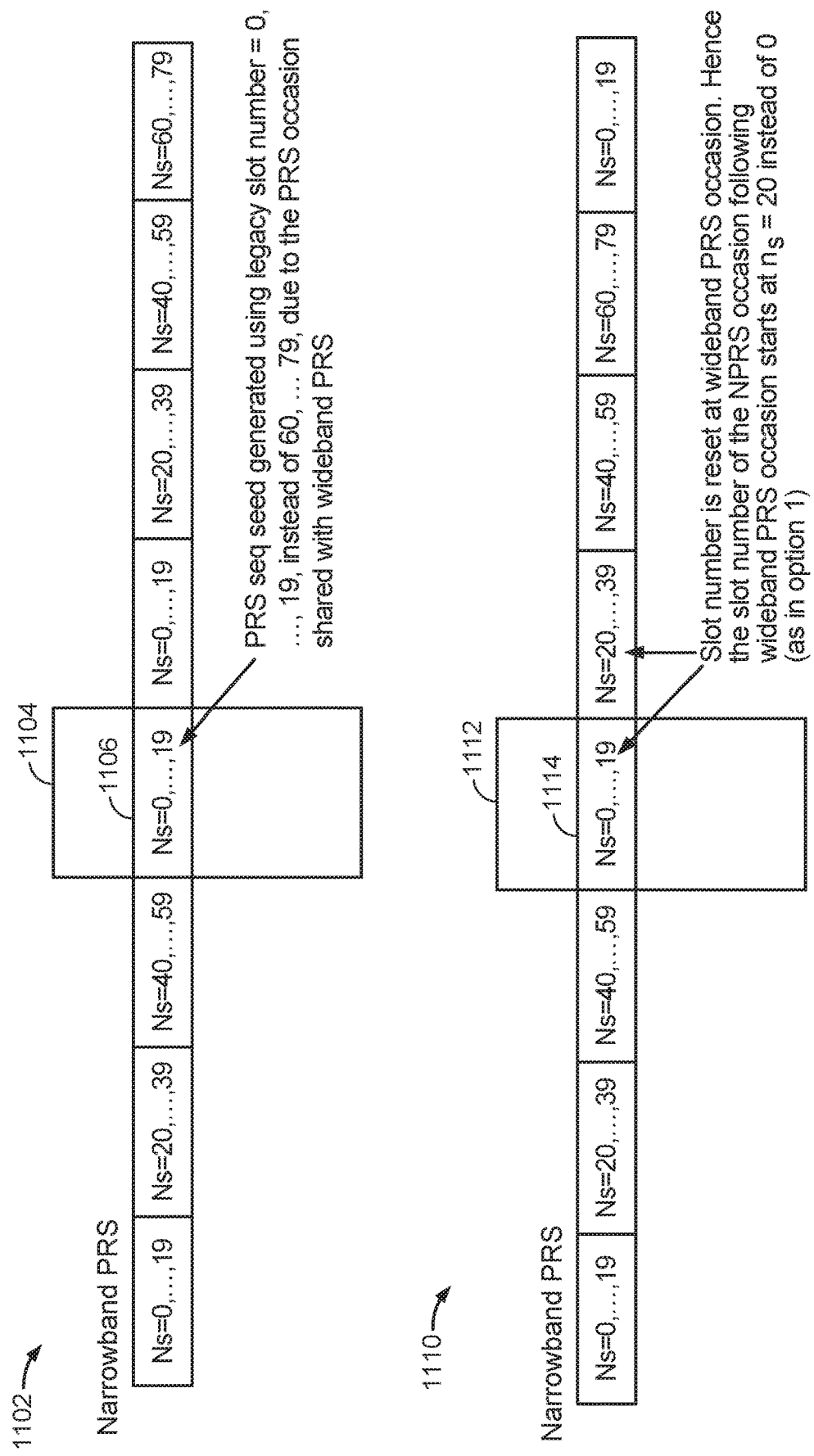
FIG. 11 illustrates two options for addressing backward compatibility issues with wideband PRS.

FIG. 11 illustrates these two options for addressing backward compatibility issues with wideband PRS. For example, time diagram 1102 illustrates the first option, where only the slot numbers (Ns) for the NPRS occasion 1106 coinciding with the wideband PRS occasion 1104 are overridden. The slot numbers are not, however, reset. Thus, at the wideband PRS occasion 1104, the slot numbers (Ns) 60 to 79 of the NPRS occasion 1106 are overridden with the slot numbers (Ns) 0 to 19 (i.e., the slot numbers of the legacy NPRS diversity sequence). Because the slot numbers are not reset, however, the next slot numbers for the next NPRS occasion continue the previous pattern, and are therefore slot numbers (Ns) 0 to 19.

Time diagram 1110 illustrates the second option, where the slot numbers (Ns) for the NPRS occasion 1114 coinciding with the wideband PRS occasion 1112 are reset. Thus, at the wideband PRS occasion 1112, the slot numbers (Ns) 60 to 79 of the NPRS occasion 1114 are overridden with the slot numbers (Ns) 0 to 19 (i.e., the slot numbers of the legacy NPRS diversity sequence). Because the slot numbers are reset, the slot numbers of the following NPRS occasion continue this numbering, and are therefore numbered 20 to 39.

Another issue with backward compatibility for legacy NB-IoT UEs is that such UEs may not understand or support the new NPRS sequence periodicity. To address this issue, as a first option, NPRS transmissions using the legacy (shorter) NPRS sequence can be embedded in the proposed NPRS transmission sequence. A legacy NB-IoT UE can be directed to use only a fraction of the NPRS occasions that employ the legacy PRS sequences, while an NB-IoT UE supporting the longer PRS sequences can be directed to use the entire NPRS occasion.

Figure 12:
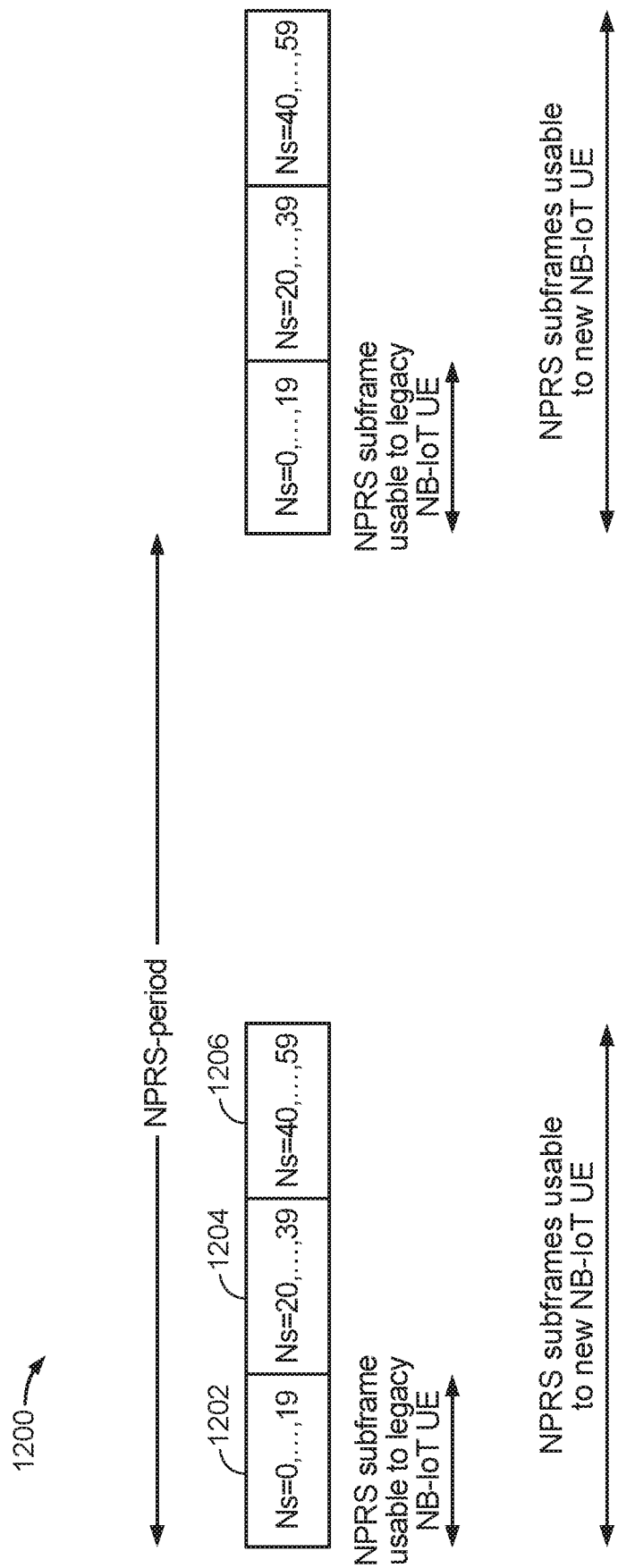
FIG. 12 illustrates a timing diagram in which legacy NPRS transmission sequences are embedded in the proposed NPRS transmission sequences.

FIG. 12 illustrates a timing diagram 1200 in which legacy NPRS transmission sequences are embedded in the proposed NPRS transmission sequences. As shown in FIG. 12, a first NPRS period includes three NPRS subframes 1202 (having slot numbers (Ns) 0 to 19), 1204 (having slot numbers (Ns) 20 to 39), and 1206 (having slot numbers (Ns) 40 to 59), all of which are usable by an NB-IoT UE configured to detect an extended NPRS sequence as described herein. However, only the first subframe, i.e., NPRS subframe 1202 having slot numbers (Ns) 0 to 19, would be usable by a legacy NB-IoT UE, as this subframe includes the legacy PRS diversity sequence.

As a second option, NPRS transmissions based on short (legacy) and extended NPRS sequences can be multiplexed in time. In this case, the location server (e.g., location server 170) signals each NB-IoT UE with its respective subframe offset and NPRS subframe duration. The actual NPRS subframe duration of each PRS sequence length could remain configurable, depending on the number of NB-IoT UEs supporting short and long PRS sequence lengths within the network. Legacy NB-IoT UEs would receive only the legacy NPRS configuration, while UEs configured to detect the longer PRS sequences may optionally receive both. The starting slot number for a new NPRS transmission can be either 0 or set based on the subframe offset from the beginning of the NPRS period. In either case, the UE should signal its capability to support the new PRS sequence length to the location server.

Figure 13:
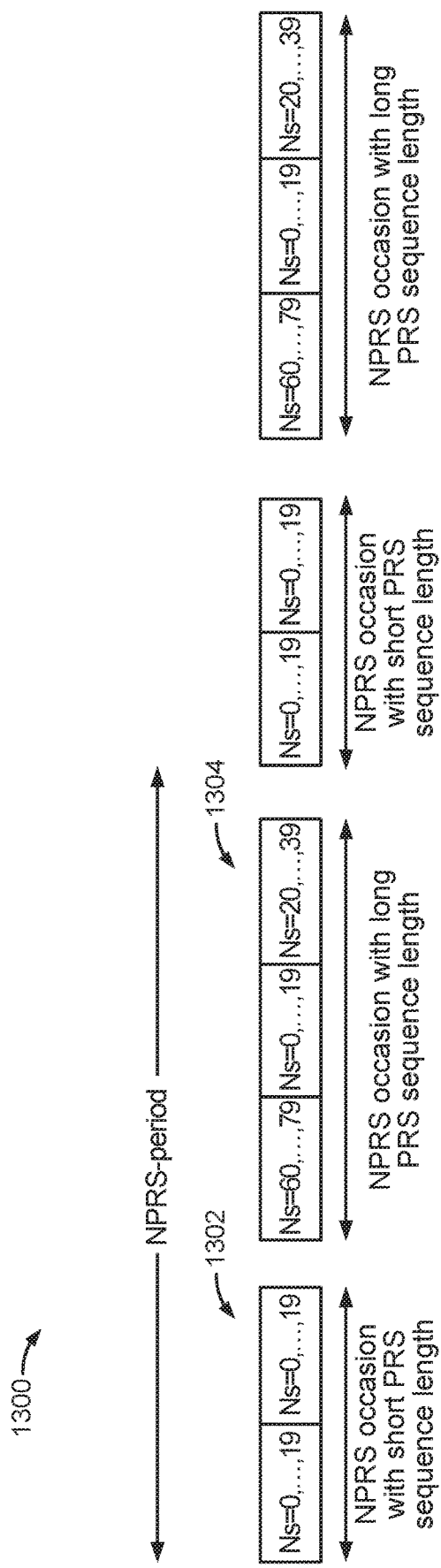
FIG. 13 illustrates a timing diagram in which legacy NPRS transmission sequences are multiplexed with the proposed NPRS transmission sequences.

FIG. 13 illustrates a timing diagram 1300 in which legacy NPRS transmission sequences are multiplexed with the proposed NPRS transmission sequences. As shown in FIG. 13, a first NPRS period includes a legacy NPRS transmission sequence 1302 comprising two subframes each having slot numbers (Ns) 0 to 19. The NPRS period also includes a long NPRS transmission sequence 1304 comprising three subframes. The first subframe has slot numbers (Ns) 0 to 19, the second has slot numbers (Ns) 20 to 39, and the third has slot numbers (Ns) 40 to 59. A legacy NB-IoT UE would be able to use the legacy NPRS transmission sequence 1302, and an NB-IoT UE capable of detecting the extended NPRS transmission sequences described herein would be able to use either the legacy NPRS transmission sequence 1302 or the long NPRS transmission sequence 1304.

Figure 14:
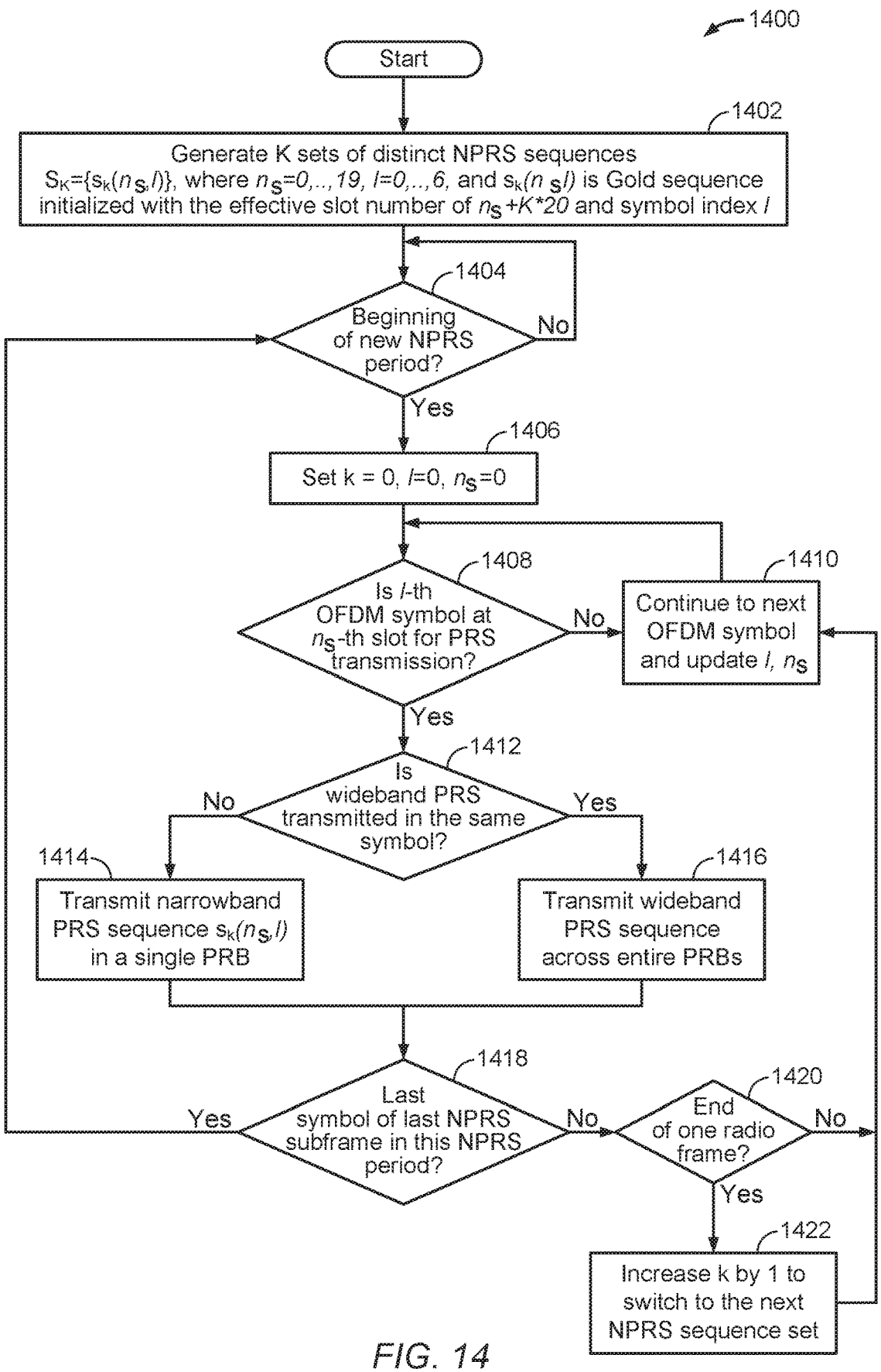
FIG. 14 illustrates an exemplary method for generating and transmitting extended NPRS sequences according to at least one aspect of the disclosure.

FIG. 14 illustrates an exemplary method 1400 for generating and transmitting extended NPRS sequences according to at least one aspect of the disclosure. The method 1400 may be performed by an eNodeB (e.g., eNodeB 200/205/210) or other network element (e.g., location server 170, E-SMLC 172, SLP 176, GMLC 174). The method 1400 may be performed in real-time, as PRS are transmitted by the eNodeB, or in advance (e.g., by the location server 170, E-SMLC 172, SLP 176, GMLC 174) to determine how PRS should be transmitted by the eNodeB.

At 1402, the method 1400 generates K sets of distinct NPRS sequences $S_K = \{s_k(ns,l)\}$, where $n_s = 0$ to 19, $l = 0$ to 6, and $s_k(n_s, l)$ is the gold sequence initialized with the effective slot number of $n_s + (K \times 20)$ and symbol index l. At 1404, the method 1400 determines whether or not the current time slot is the beginning of a new NPRS period. If it is not, the method 1400 waits until it is. At 1406, if it is the beginning of a new NPRS period, the method 1400 sets k to 0, l to 0, and $n_s$ to 0. At 1408, the method 1400 determines whether or not the lth OFDM symbol in the $n_s$th timeslot is for PRS transmission (i.e., whether PRS is to be transmitted on the OFDM symbol l of the $n_s$th timeslot). If it is not, then at 1410, the method 1400 continues to the next OFDM symbol and updates l and $n_s$.

If, however, the lth OFDM symbol at the $n_s$th time slot is for PRS transmission, then at 1412, the method 1400 determines whether or not wideband PRS is transmitted in the same symbol. If it is not, then at 1414, the method 1400 transmits the NPRS sequence $s_k(n_s, l)$ in a single PRB (i.e., the PRB assigned for the NPRS transmission of the NB-IoT cell). In that way, the NPRS sequence is transmitted on different slot/symbol combinations of the same PRB. Said another way, NPRS are transmitted on the same PRB using a different NPRS sequence across different symbols/subframes/radio frames. If, however, wideband PRS is transmitted in the same symbol, then at 1416, the method 1400 transmits the wideband PRS sequence across all PRBs (as illustrated in FIG. 11).

At 1418, the method 1400 determines whether the current OFDM symbol is the last symbol of the last NPRS subframe of the current NPRS period. If it is, the method 1400 returns to 1404. If it is not, however, then at 1420, the method 1400 determines whether or not it is the end of a radio frame. If it is not, the method 1400 returns to 1410. If it is, however, then at 1422, the method 1400 increments k by 1 to switch to the next NPRS sequence set, and the method 1400 returns to 1410.

Figure 15:
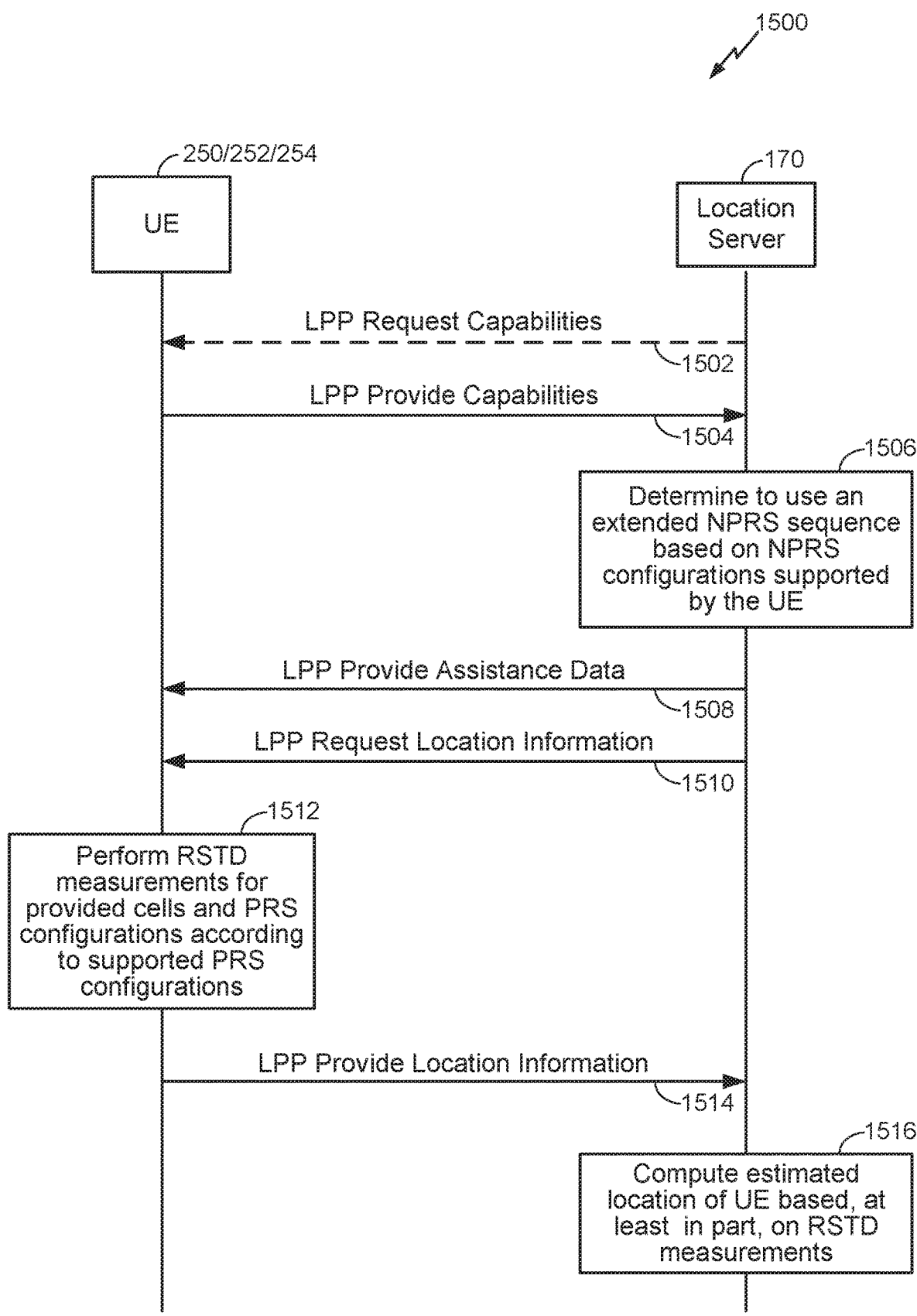
FIG. 15 shows an exemplary signaling flow illustrating the LTE Positioning Protocol (LPP).

FIG. 15 shows an exemplary signaling flow 1500 illustrating the LPP protocol. For OTDOA positioning, LPP is used between the location server (e.g., location server 170) and the UE (e.g., UE 250/252/254). The illustrated LPP protocol can be used to communicate a UE's ability to measure an extended NPRS sequence as described herein. As illustrated in FIG. 15, positioning of the UE 250/252/254 is supported via an exchange of LPP messages between the UE 250/252/254 and the location server 170 (e.g., the E-SMLC 172 or SLP 176). The LPP messages may be exchanged between the UE 250/252/254 and the location server 170 via one or more intermediate networks, such as RAN 120 (e.g., via eNodeB 200/205/210) and core network 140 (e.g., via MME 215 with a control plane location solution when location server 170 comprises E-SMLC 172 or via PDG 235 and SGW 230 with a user plane location solution when location server 170 comprises SLP 176). The LPP messages and the procedures that they support are described in 3GPP TS 36.355. The procedure shown in FIG. 15 may be used to position the UE 250/252/254 in order to support various location-related services, such as navigation for UE 250/252/254 (or for the user of UE 250), or for routing, or for other location services.

Initially, and as an optional operation of signaling flow 1500, the UE 250/252/254 may receive a request for its positioning capabilities from the location server 170 at stage 1502 (e.g., an LPP Request Capabilities message). At stage 1504, the UE 250/252/254 provides its positioning capabilities to the location server 170 relative to the LPP protocol by sending an LPP Provide Capabilities message to location server 170 indicating the position methods and features of these position methods that are supported by the UE 250/252/254 using LPP. The capabilities indicated in the LPP Provide Capabilities message may, in some aspects, indicate that the UE 250/252/254 supports OTDOA positioning and may indicate the capabilities of the UE 250/252/254 to support OTDOA. The UE 250/252/254 can include (N)PRS capability parameters describing supported (N)PRS configurations for OTDOA in the LPP Provide Capabilities message. For example, the (N)PRS capability parameters can indicate the ability of the UE 250/252/254 to detect and measure an extended NPRS sequence as described herein.

At stage 1506, the location server 170 determines to use an extended NPRS sequence for OTDOA based on the indicated UE 250/252/254 support for OTDOA and the extended NPRS sequence at stage 1504. The location server 170 determines a reference cell and neighbor cells (or a reference cell set and/or neighbor cell sets) for OTDOA based at least in part on the (N)PRS capability parameters received at stage 1504. The location server 170 may further determine (e.g., according to the method 1400 illustrated in FIG. 14) one or more extended NPRS sequences to be measured by the UE 250/252/254 for each one of the reference cell and each neighbor cell (or for each one of a reference cell set and/or neighbor cell sets) based on the (N)PRS capability parameters received from the UE at stage 1504. The location server 170 then sends an LPP Provide Assistance Data message to the UE 250/252/254 at stage 1508. In some implementations, the LPP Provide Assistance Data message at stage 1508 may be sent by the location server 170 to the UE 250/252/254 in response to an LPP Request Assistance Data message sent by the UE 250/252/254 to the location server 170 (not shown in FIG. 15).

The LPP Provide Assistance Data message may include positioning assistance data in the form of OTDOA assistance data to enable or to help enable the UE 250/252/254 to obtain and return OTDOA RSTD measurements, and may include information for the reference cell (or reference cell set) identified at stage 1506 (e.g., corresponding to one of eNodeBs 200, 205, 210). The information for the reference cell (or reference cell set) may include a global ID for the reference cell (or a global ID for each cell in a reference cell set), a physical cell ID for the reference cell (or a physical cell ID for each cell in reference cell set), carrier frequency information, and PRS configuration parameters for the PRS configurations determined for the reference cell (or reference cell set) at stage 1506 (e.g., PRS bandwidth, PRS carrier frequency, number of subframes per PRS positioning occasion, PRS code sequence, starting point and periodicity of PRS positioning occasions, PRS direction of transmission and/or muting sequence).

The LPP Provide Assistance Data message may also include OTDOA assistance data for neighbor cells (and/or neighbor cell sets) identified at stage 1506 (e.g., corresponding to one or more of eNodeBs 200, 205, 210). The information provided for each neighbor cell (and/or each neighbor cell set) in the LPP Provide Assistance Data message may be similar to that provided for the reference cell (e.g., may include a cell ID, cell frequency, and PRS configuration parameters for the PRS configurations determined at stage 1506) and may further include, for example, a slot number and/or subframe offset between the neighbor cell (or neighbor cell set) and the reference cell (or reference cell set), and/or an expected approximate RSTD value and RSTD uncertainty. The PRS configuration parameters provided by the location server for the reference cell (or reference cell set) and each neighbor cell (or neighbor cell set) at stage 1508 may be as described in association with FIGS. 7-9 and 11-13.

At stage 1510, the location server 170 sends a request for location information to the UE 250/252/254. The request may be an LPP Request Location Information message. Note that in some implementations, the LPP Provide Assistance Data message sent at stage 1508 may be sent after the LPP Request Location Information message at 1510—e.g., if UE 250/252/254 sends a request for assistance data to location server 170 (e.g., in an LPP Request Assistance Data message, not shown in FIG. 15) after receiving the request for location information at stage 1510. The request for location information sent at stage 1510 may request the UE 250/252/254 to obtain RSTD measurements for OTDOA—e.g., in association with the information for the reference cell (or reference cell set), neighbor cells (and/or neighbor cell sets) and PRS configuration parameters sent to UE 250/252/254 at stage 1508.

At stage 1512, the UE 250/252/254 utilizes the OTDOA positioning assistance information received at stage 1508 and any additional data (e.g., a desired location accuracy or a maximum response time) received at stage 1510 to perform RSTD measurements for the OTDOA position method. The RSTD measurements may be made between the reference cell (set) indicated at stage 1508, or a reference cell (or reference cell set) determined by the UE from the neighbor cells (and/or neighbor cell sets) indicated at stage 1508, and one or more of the (other) neighbor cells (and/or neighbor cell sets) indicated at stage 1508. The UE 250/252/254 utilizes the PRS configuration parameters for the reference and neighbor cells (and/or cell sets) provided at stage 1508 to acquire and measure PRS signals for these cells (e.g., NPRS of an extended NPRS sequence as described herein), and according to the PRS configurations supported by UE 250/252/254, in order to obtain RSTD measurements.

At stage 1514, the UE 250/252/254 may send an LPP Provide Location Information message to the location server 170 conveying the RSTD measurements that were obtained at stage 1512 and before or when any maximum response time has expired (e.g., a maximum response time provided by the location server 170 at stage 1510). The LPP Provide Location Information message at stage 1514 may include the time (or times) at which the RSTD measurements were obtained, the PRS configurations used (e.g., which type of (N)PRS was measured, such as the (N)PRS bandwidth or number of resource blocks that were measured) and the identity of the reference cell (or an identity of one cell in a reference cell set) for the RSTD measurements (e.g., the reference cell ID and carrier frequency). The message at stage 1514 may also include a neighbor cell measurement list including, for each measured neighbor cell (and/or for each measured neighbor cell set), the identity of the cell or of one cell in a cell set (e.g., the physical cell ID, global cell ID, and/or cell carrier frequency), the RSTD measurement for the cell (or cell set), and the quality of the RSTD measurement for the cell (or cell set) (e.g., the expected error in the RSTD measurements). The neighbor cell measurement list may include RSTD data for one or more cells.

At stage 1516, the location server 170 computes an estimated location of the UE 250/252/254 using OTDOA positioning techniques based, at least in part, on measurements received in the LPP Provide Location Information message at stage 1514 (e.g., RSTD measurements). In an alternative aspect (not shown in FIG. 15), the location computation at stage 1516 may be performed by the UE 250/252/254 after stage 1512. For example, the positioning assistance data transferred in the message at stage 1508 may include base station almanac (BSA) data for the reference cell(s) and neighbor cells (e.g., cell antenna location coordinates and timing or time synchronization information). In that case, the UE 250/252/254 may return any computed location estimate to the location server 170 in the message at stage 1514 and stage 1516 may not be performed.

FIG. 15 shows, and other figures reference, exemplary support for OTDOA positioning with LTE radio access by a UE (e.g., UE 250/252/254) and, in some cases, using the LPP positioning protocol. However, other examples exist where the support of PRS capability parameters and PRS configuration parameters by a UE and location server may be similar to or the same as that described for these figures but where the positioning protocol, the position method and/or the radio access type (RAT) may be different. For example, in alternative aspects, the positioning protocol may be LPP Extensions (LPPe) defined by OMA, a combination of LPP with LPPe (referred to as LPP/LPPe), the Resource Radio Control (RRC) protocol defined in 3GPP TS 36.331, the IS-801 protocol defined in 3GPP2 TS C.S0022, or an evolution of LPP for NR or 5G RAT access (e.g., which may be referred to as a New Radio (NR) Positioning Protocol or NPPa or NRPPa). Similarly, the position method may be OTDOA for Universal Mobile Telecommunications System (UMTS) access, Enhanced Observed Time Difference (E-OTD) for GSM, Advanced Forward Link Trilateration (AFLT) or OTDOA for NR or 5G radio access. Further, the RAT may be UMTS (e.g., when the position method is OTDOA for UMTS) or may be NR or 5G (e.g., when the position method is OTDOA for NR or 5G). In addition, the downlink signal that is measured by a UE (e.g., UE 250/252/254) and broadcast by a base station (e.g., eNodeB 200/205/210 in the case of PRS) may not be a PRS signal but some other downlink reference signal or pilot signal (e.g., a cell-specific reference signal (CRS) for LTE or a tracking reference signal (TRS) for NR or 5G) and the measurements of the downlink signal may not be of RSTD but instead (or in addition) of some other characteristic such as Time of Arrival (TOA), Angle of Arrival (AOA), Received Signal Strength Indicator (RSSI), Round Trip signal propagation Time (RTT), Signal-to-Noise (S/N) ratio, etc. Although the positioning protocol, the position method, the RAT, and/or the measured characteristics may differ, the provision of PRS (or other reference signal) capability parameters by the UE at stage 1504 in signaling flow 1500 and provision of PRS (or other reference signal) configuration parameters by the location server at stage 1508 may be the same as or similar to that described previously.

Figure 16:
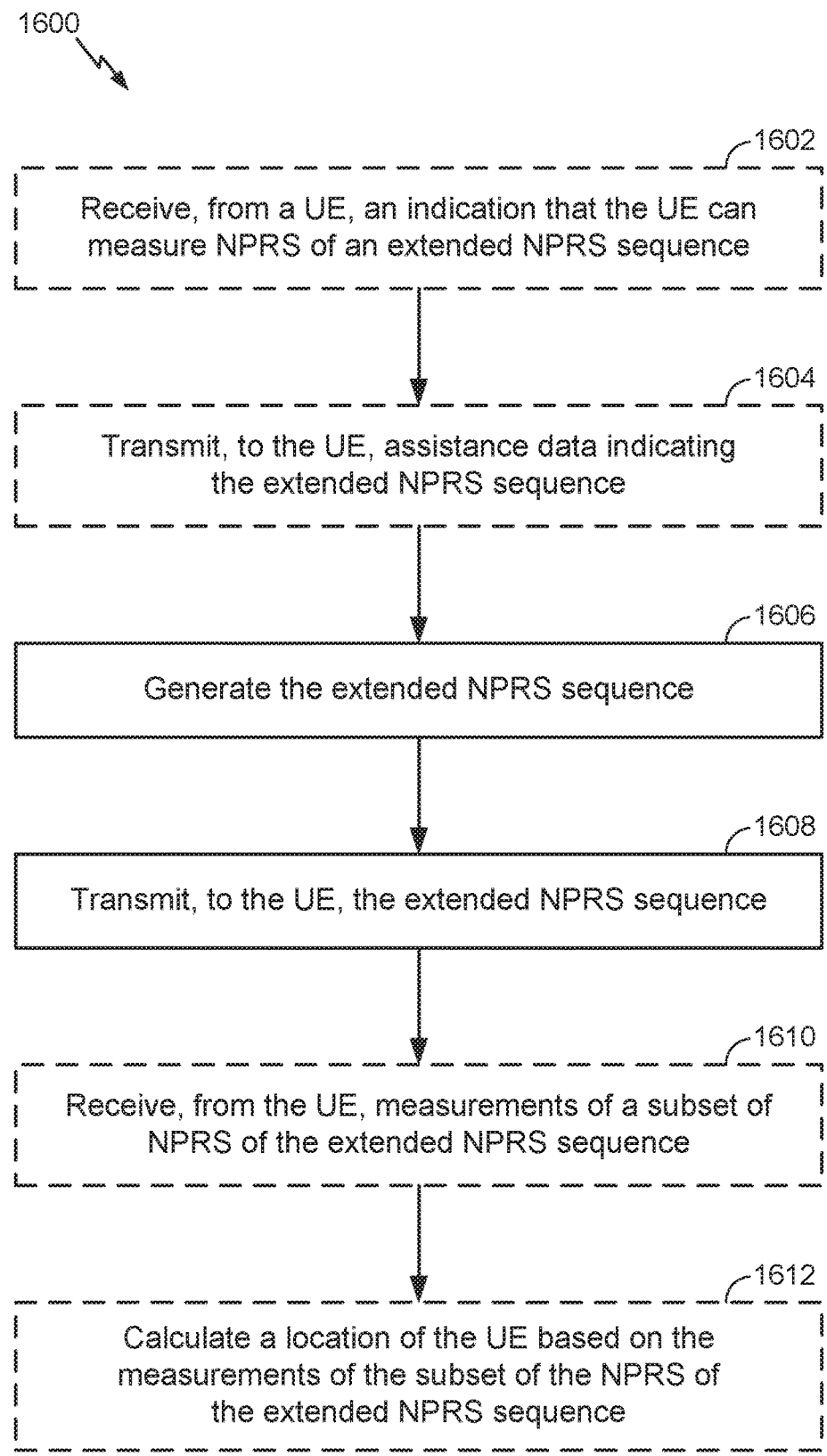
FIGS. 16 and 17 illustrate exemplary process flows according to at least one aspect of the disclosure.

FIG. 16 illustrates an exemplary method 1600 for transmitting an extended sequence of NPRS according to at least one aspect of the disclosure. The method 1600 may be performed by an eNodeB (e.g., eNodeB 200/205/210). At 1602, the eNodeB optionally receives, from a UE (e.g., UE 250/252/254), an indication that the UE can measure NPRS of an extended NPRS sequence (e.g., as at 1504 of FIG. 15, where the eNodeB forwards this information from the UE to the location server). At 1604, the eNodeB optionally transmits assistance data to the UE indicating the extended NPRS sequence (e.g., as at 1508 of FIG. 15, where the eNodeB forwards this information to the UE from the location server). Operations 1602 and 1604 are optional because this information may have been previously provisioned (e.g., during a previous communication session, by an original equipment manufacturer (OEM), etc.).

At 1606, the eNodeB generates the extended NPRS sequence (e.g., according to the method 1400 illustrated in FIG. 14). In an aspect, generating the extended NPRS sequence may include the eNodeB generating the signal transmissions that make up the extended NPRS sequence based on provisioning of the extended NPRS sequence from the location server. Alternatively, the eNodeB may generate the NPRS sequence without input from the location server, but rather, based on its capabilities or the wireless environment. In an aspect, the extended NPRS sequence may be a function of a plurality of slot numbers of a plurality of slots of a plurality of sequential radio frames and a plurality of symbol indexes of a plurality of symbols of a single physical resource block, as discussed above with reference to FIG. 8. At 1608, the eNodeB transmits the extended NPRS sequence to the UE over a wireless narrowband channel. In an aspect, the eNodeB may transmit the extended NPRS sequence on the plurality of symbols of the single physical resource block corresponding to the plurality of symbol indexes and across the plurality of slots of the plurality of sequential radio frames corresponding to the plurality of slot numbers. By employing a higher NPRS sequence diversity across time (e.g., over the plurality of slot numbers of the plurality of slots of the plurality of sequential radio frames), the effective sequence length of the NPRS transmission is extended. In the specific example of FIG. 16, by resetting the slot number every plurality of slot numbers of the plurality of slots of the plurality of sequential radio frames, instead of over a single radio frame, NPRS sequence diversity is achieved across the time domain.

At 1610, the eNodeB optionally receives measurements of a subset of NPRS of the extended NPRS sequence from the UE (e.g., as at 1514 of FIG. 15, where the eNodeB forwards this information from the UE to the location server). At 1612, the eNodeB optionally calculates a location of the UE based on the measurements of the subset of the NPRS of the extended NPRS sequence. Operation 1612 is optional because the eNodeB may forward the measurements of the subset of the NPRS of the extended NPRS sequence to a location server (e.g., location server 170, E-SMLC 172, SLP 176, GMLC 174) as at 1514 of FIG. 15. Although not illustrated in FIG. 16, the method 1600 may further include transmitting the location of the UE to the UE. Operations 1610 and 1612 are also optional because the UE may calculate its location based on the measurements, rather than the eNodeB or location server.

Figure 17:
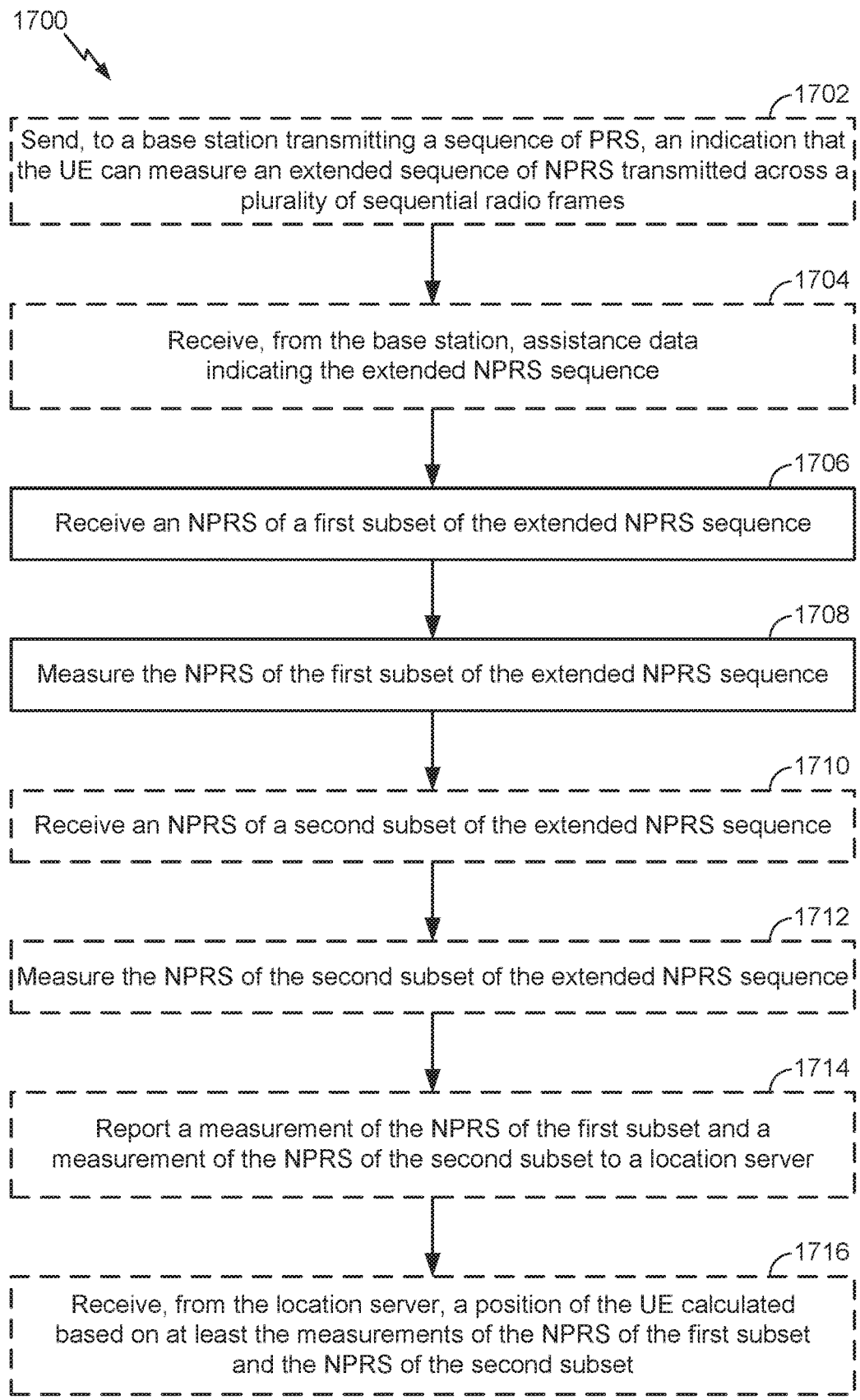

FIG. 17 illustrates an exemplary method 1700 for measuring an extended sequence of NPRS according to at least one aspect of the disclosure. The method 1700 may be performed by a UE (e.g., UE 250/252/254). At 1702, the UE optionally sends, to a base station transmitting the sequence of PRS (e.g., eNodeB 200/205/210), an indication that the UE can measure an extended sequence of NPRS transmitted across a plurality of sequential radio frames (e.g., as at 1504 of FIG. 15, where the eNodeB forwards this information from the UE to the location server). At 1704, the UE optionally receives assistance data indicating the extended NPRS sequence (e.g., as at 1508 of FIG. 15). Operations 1702 and 1704 are optional because this information may have been previously provisioned (e.g., during a previous communication session, by an original equipment manufacturer (OEM), etc.).

At 1706, the UE receives an NPRS of a first subset of the extended NPRS sequence. In an aspect, the extended NPRS sequence may be a function of a plurality of slot numbers of a plurality of slots of a plurality of sequential radio frames and a plurality of symbol indexes of a plurality of symbols of a single physical resource block. At 1708, the UE measures the NPRS of the first subset of the extended NPRS sequence (e.g., as at 1512 of FIG. 15). By employing a higher NPRS sequence diversity across time (e.g., over the plurality of slot numbers of the plurality of slots of the plurality of sequential radio frames), the effective sequence length of the NPRS transmission is extended. In the specific example of FIG. 17, as in the example of FIG. 16, by resetting the slot number every plurality of slot numbers of the plurality of slots of the plurality of sequential radio frames, instead of over a single radio frame, NPRS sequence diversity is achieved across the time domain.

At 1710, the UE optionally receives an NPRS of a second subset of the extended NPRS sequence. At 1712, the UE optionally measures the NPRS of the second subset of the extended NPRS sequence (e.g., as at 1512 of FIG. 15). Operations 1710 and 1712 are optional because, for example, the UE may determine its position, or assist in the determination of its position, using a single measurement. At 1714, the UE optionally reports at least a measurement of the NPRS of the first subset and a measurement of the NPRS of the second subset to a location server (e.g., location server 170, E-SMLC 172, SLP 176, GMLC 174) (e.g., as at 1514 of FIG. 15). At 1716, the UE receives, from the location server, a position of the UE calculated based on at least the measurement of the NPRS of the first subset and the measurement of the NPRS of the second subset. Operations 1714 and 1716 are optional because the UE may calculate its location based on the measurements, rather than the eNodeB or location server.

In an aspect, in both the examples of FIGS. 16 and 17, where a radio frame of the plurality of sequential radio frames coincides with a wideband (or legacy) PRS occasion, the current slot number of the plurality of slot numbers is reset to correspond to a slot number of a plurality of slots of the wideband PRS occasion, as discussed above with reference to FIG. 11. Following the wideband PRS occasion, the plurality of slot numbers may increment for the remaining slots of the plurality of slots by continuing from the last slot number of the plurality of slots of the wideband PRS occasion. Such a technique provides backward compatibility for UE's not capable of wideband PRS.

In an aspect, if a radio frame of the plurality of sequential radio frames coincides with a wideband PRS occasion, a PRS sequence of the wideband PRS occasion can be utilized during the wideband PRS occasion instead of the extended NPRS sequence. Following the wideband PRS occasion, the plurality of slot numbers may continue to increment for the remaining slots of the first plurality of subframes of the plurality of sequential radio frames. Such a technique provides backward compatibility for UE's not capable of wideband PRS.

Figure 18:
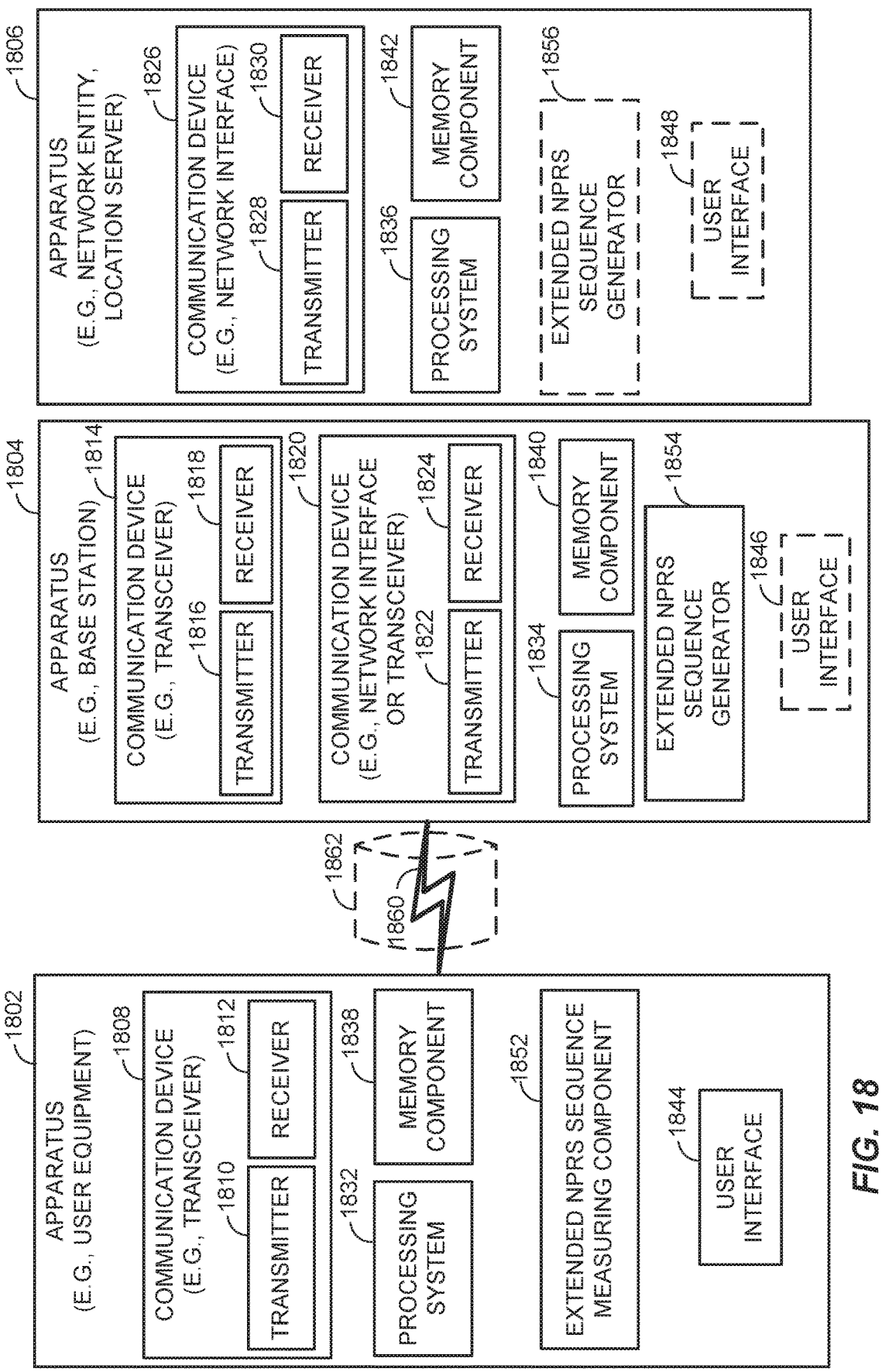
FIG. 18 is a simplified block diagram of several sample aspects of components that may be employed in wireless communication nodes and configured to support communication as taught herein.

FIG. 18 illustrates several sample components (represented by corresponding blocks) that may be incorporated into an apparatus 1802, an apparatus 1804, and an apparatus 1806 (corresponding to, for example, a UE, a base station (e.g., an eNodeB), and a network entity or location server, respectively) to support the operations as disclosed herein. As an example, the apparatus 1802 may correspond to a UE 250/252/254, the apparatus 1804 may correspond to any of eNodeBs 200/205/210, and the apparatus 1806 may correspond to the location server 170, E-SMLC 172, SLP 176, or GMLC 174. It will be appreciated that the components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1802 and the apparatus 1804 each include at least one wireless communication device (represented by the communication devices 1808 and 1814) for communicating with other nodes via at least one designated radio access technology (RAT) (e.g., LTE). Each communication device 1808 includes at least one transmitter (represented by the transmitter 1810) for transmitting and encoding signals (e.g., measurements, messages, indications, information, and so on) and at least one receiver (represented by the receiver 1812) for receiving and decoding signals (e.g., reference signals, messages, indications, information, pilots, and so on). For example, receiver 1812 may be used to measure NPRS as described herein. Transmitter 1810 may be used to transmit measurements of NPRS to assist location of the apparatus 1802 according to techniques described herein. Similarly, each communication device 1814 includes at least one transmitter (represented by the transmitter 1816) for transmitting signals (e.g., reference signals, messages, indications, information, pilots, and so on) and at least one receiver (represented by the receiver 1818) for receiving signals (e.g., messages, indications, information, and so on). For example, transmitter 1816 may be used to transmit NPRS as described herein. Receiver 1818 may be used to receive measurements of NPRS to assist location of the apparatus 1802 according to techniques described herein.

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1804 may also comprise a Network Listen Module (NLM) or the like for performing various measurements.

The apparatus 1804 and the apparatus 1806 include at least one communication device (represented by the communication device 1820 and the communication device 1826) for communicating with other nodes. For example, the communication device 1826 may comprise a network interface that is configured to communicate with one or more network entities via a wire-based or wireless backhaul connection. In some aspects, the communication device 1826 may be implemented as a transceiver configured to support wire-based or wireless signal communication. This communication may involve, for example, sending and receiving: messages, parameters, or other types of information. Accordingly, in the example of FIG. 18, the communication device 1826 is shown as comprising a transmitter 1828 and a receiver 1830. Similarly, the communication device 1820 may comprise a network interface that is configured to communicate with one or more network entities via a wire-based or wireless backhaul. As with the communication device 1826, the communication device 1820 is shown as comprising a transmitter 1822 and a receiver 1824.

The apparatuses 1802, 1804, and 1806 also include other components that may be used in conjunction with the operations as disclosed herein. The apparatus 1802 includes a processing system 1832 (a processor, an ASIC, etc.) for providing functionality relating to, for example, NPRS measurements as disclosed herein and for providing other processing functionality. The apparatus 1804 includes a processing system 1834 for providing functionality relating to, for example, NPRS transmission as disclosed herein and for providing other processing functionality. The apparatus 1806 includes a processing system 1836 for providing functionality relating to, for example, NPRS transmission as disclosed herein and for providing other processing functionality.

The apparatuses 1802, 1804, and 1806 include memory components 1838, 1840, and 1842 (e.g., each including a memory device), respectively, for maintaining information (e.g., information indicative of reserved resources, thresholds, parameters, and so on). In addition, the apparatuses 1802, 1804, and 1806 may include user interface devices 1844, 1846, and 1848, respectively, for providing indications (e.g., audible and/or visual indications) to a user and/or for receiving user input (e.g., upon user actuation of a sensing device such a keypad, a touch screen, a microphone, and so on).

For convenience, the apparatuses 1802, 1804, and/or 1806 are shown in FIG. 18 as including various components that may be configured according to the various examples described herein. It will be appreciated, however, that the illustrated blocks may have different functionality in different designs.

The components of FIG. 18 may be implemented in various ways. In some implementations, the components of FIG. 18 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1808, 1832, 1838, and 1844 may be implemented by processor and memory component(s) of the apparatus 1802 (e.g., by execution of appropriate code and/or by appropriate configuration of processor components). Similarly, some or all of the functionality represented by blocks 1814, 1820, 1834, 1840, and 1846 may be implemented by processor and memory component(s) of the apparatus 1804 (e.g., by execution of appropriate code and/or by appropriate configuration of processor components). Also, some or all of the functionality represented by blocks 1826, 1836, 1842, and 1848 may be implemented by processor and memory component(s) of the apparatus 1806 (e.g., by execution of appropriate code and/or by appropriate configuration of processor components).

In an aspect, the apparatus 1804 may correspond to an eNodeB. The apparatus 1802 may transmit and receive messages via a wireless link 1860 with the apparatus 1804, the messages including information related to various types of communication (e.g., voice, data, multimedia services, associated control signaling, reference signals, etc.). The wireless link 1860 may operate over a communication medium of interest, shown by way of example in FIG. 18 as the medium 1862, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 1804 and the apparatus 1802 for the medium 1862.

As a particular example, the medium 1862 may correspond to at least a portion of a licensed frequency band. In general, the apparatus 1802 and the apparatus 1804 may operate via the wireless link 1860 according to one or more radio access types, such as LTE or Fifth Generation (5G) New Radio (NR), depending on the network in which they are deployed. These networks may include, for example, different variants of CDMA networks (e.g., LTE networks), Time Division Multiple Access (TDMA) networks, Frequency Division Multiple Access (FDMA) networks, Orthogonal FDMA (OFDMA) networks, Single-Carrier FDMA (SC-FDMA) networks, and so on.

Apparatus 1802 may also include an extended NPRS sequence measuring component 1852 that may be executed to cause the processing system 1832 and/or the communication device 1808 to obtain location related measurements of signals (e.g., NPRS or other signals) transmitted by a base station (e.g., any of eNodeBs 200/205/210) according to techniques described herein. For example, the apparatus 1802 may perform the method 1700 illustrated in FIG. 17. Thus, in an aspect, the extended NPRS sequence measuring component 1852, when executed, may cause the receiver 1812 to receive at least a first reference signal of the extended NPRS sequence over a wireless narrowband channel, wherein the extended NPRS sequence may be a function of a plurality of slot numbers of a plurality of slots of a plurality of sequential radio frames and a plurality of symbol indexes of a plurality of symbols of a single physical resource block, and may cause the communication device 1808 or a processor of the processing system 1832 to measure at least the first reference signal of the extended NPRS sequence. Location related measurements may include measurements of RSTD for OTDOA positioning and/or measurements of signal propagation time or round trip time (RTT) between apparatus 1802 and apparatus 1804.

Apparatuses 1804 and 1806 may each include an extended NPRS sequence generator 1854 and 1856, respectively, which may be executed to cause the processing system 1834 and/or 1836 to determine an extended NPRS sequence according to techniques described herein. For example, the apparatuses 1804 and 1806 may perform the method 1600 illustrated in FIG. 16. Thus, in an aspect, the extended NPRS sequence generator 1854/1856, when executed, may cause a processor of the processing system 1834/1836 to generate the extended NPRS sequence. In an aspect, the extended NPRS sequence may be a function of a plurality of slot numbers of a plurality of slots of a plurality of sequential radio frames and a plurality of symbol indexes of a plurality of symbols of a single physical resource block. The extended NPRS sequence generator 1854 may also, when executed, cause transmitter 1822 to transmit, to at least one UE over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers. Location related measurements obtained by apparatuses 1804 and/or 1806 may include measurements of OTDOA between pairs of base stations, such as pairs of any of eNodeBs 200/205/210.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, DVD, floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for transmitting an extended narrowband positioning reference signals (NPRS) sequence, comprising:
generating, by a base station, the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames; and
transmitting, by the base station to at least one user equipment (UE) over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers,
wherein, based on a radio frame of the plurality of sequential radio frames coinciding with a wideband positioning reference signal (PRS) occasion, a PRS sequence of the wideband PRS occasion is utilized during the wideband PRS occasion instead of the extended NPRS sequence, and
wherein, following the wideband PRS occasion, the plurality of slot numbers continues to increment for the remaining slots of the plurality of slots of the plurality of sequential radio frames.

2. The method of claim 1, further comprising:
transmitting, to the at least one UE, assistance data indicating the extended NPRS sequence.

3. The method of claim 1, further comprising:
receiving, from the at least one UE, measurements of a subset of NPRS of the extended NPRS sequence.

4. The method of claim 1, further comprising:
receiving, from the at least one UE, an indication that the at least one UE can measure NPRS of the extended NPRS sequence.

5. The method of claim 1, wherein the plurality of slot numbers of the plurality of slots increments across the plurality of sequential radio frames.

6. The method of claim 1, further comprising:
transmitting assistance data to the at least one UE indicating the wideband PRS occasion.

7. A method for transmitting an extended narrowband positioning reference signals (NPRS) sequence, comprising:
generating, by a base station, the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames; and
transmitting, by the base station to at least one user equipment (UE) over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers,
wherein, based on a radio frame of the plurality of sequential radio frames coinciding with a wideband positioning reference signal (PRS) occasion, resetting a current slot number of the plurality of slot numbers to correspond to a slot number of a plurality of slots of the wideband PRS occasion, and wherein, following the wideband PRS occasion, the plurality of slot numbers increments for the remaining slots of the plurality of slots by continuing from the slot number of the plurality of slots of the wideband PRS occasion.

8. A method for transmitting an extended narrowband positioning reference signals (NPRS) sequence, comprising:

generating, by a base station, the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames;

transmitting, by the base station to at least one user equipment (UE) over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers, wherein the extended NPRS sequence transmitted across the plurality of sequential radio frames starts with a legacy NPRS sequence in a first radio frame of the plurality of sequential radio frames; and transmitting, based on the at least one UE not being able to detect the extended NPRS sequence across each of the plurality of sequential radio frames, assistance data to the at least one UE directing the at least one UE to utilize only the legacy NPRS sequence.

9. A method for transmitting an extended narrowband positioning reference signals (NPRS) sequence, comprising:

generating, by a base station, the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames;

transmitting, by the base station to at least one user equipment (UE) over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers, wherein the extended NPRS sequence transmitted across the plurality of sequential radio frames is multiplexed with a legacy NPRS sequence transmitted across the plurality of sequential radio frames; and transmitting, based on the at least one UE being able to detect the extended NPRS sequence across each of the plurality of sequential radio frames, assistance data to the at least one UE directing the at least one UE to utilize only the extended NPRS sequence or both the extended NPRS sequence and the legacy NPRS sequence.

10. A method for measuring an extended narrowband positioning reference signals (NPRS) sequence, comprising:

receiving, at a user equipment (UE) over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames; and measuring, by the UE, the NPRS of the first subset of the extended NPRS sequence, wherein, based on a radio frame of the plurality of sequential radio frames coinciding with a wideband positioning reference signal (PRS) occasion, a PRS sequence of the wideband PRS occasion is utilized during the wideband PRS occasion instead of the extended NPRS sequence, and wherein, following the wideband PRS occasion, the plurality of slot numbers continues to increment for the remaining slots of the plurality of slots of the plurality of sequential radio frames.

11. The method of claim 10, further comprising:

measuring, by the UE, an NPRS of a second subset of the extended NPRS sequence, wherein the second subset comprises all NPRS of the extended NPRS sequence other than the first subset; and averaging, by the UE, a measurement of the NPRS of the first subset of the extended NPRS sequence and a measurement of the NPRS of the second subset of the extended NPRS sequence.

12. The method of claim 10, further comprising:

receiving, at the UE, an NPRS of a second subset of the extended NPRS sequence;

measuring, by the UE, the NPRS of the second subset of the extended NPRS sequence;

reporting a measurement of the NPRS of the first subset of the extended NPRS sequence and a measurement of the NPRS of the second subset of the extended NPRS sequence to a location server; and receiving, from the location server, a position of the UE calculated based on the measurement of the NPRS of the first subset of the extended NPRS sequence and the measurement of the NPRS of the second subset of the extended NPRS sequence.

13. The method of claim 10, further comprising:

receiving, from a base station transmitting the extended NPRS sequence, assistance data indicating the extended NPRS sequence.

14. The method of claim 10, further comprising:

sending, to a base station transmitting the extended NPRS sequence, an indication that the UE can measure the extended NPRS sequence.

15. The method of claim 10, wherein the plurality of slot numbers of the plurality of slots increments across the plurality of sequential radio frames.

16. A method for measuring an extended narrowband positioning reference signals (NPRS) sequence, comprising:

receiving, at a user equipment (UE) over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames; and measuring, by the UE, the NPRS of the first subset of the extended NPRS sequence, wherein, based on a radio frame of the plurality of sequential radio frames coinciding with a wideband positioning reference signal (PRS) occasion, a current slot number of the plurality of slot numbers is reset to correspond to a slot number of a plurality of slots of the wideband PRS occasion, and wherein, following the wideband PRS occasion, the plurality of slot numbers increments for the remaining slots of the plurality of slots by continuing from the slot number of the plurality of slots of the wideband PRS occasion.

17. The method of claim 10, wherein the extended NPRS sequence transmitted across the plurality of sequential radio frames starts with a legacy NPRS sequence in a first radio frame of the plurality of sequential radio frames.

18. The method of claim 10, wherein the extended NPRS sequence transmitted across the plurality of sequential radio frames is multiplexed with a legacy NPRS sequence transmitted across the plurality of sequential radio frames.

19. An apparatus for transmitting an extended narrowband positioning reference signals (NPRS) sequence, comprising:
at least one processor of a base station configured to generate the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames; and
a transmitter of the base station configured to transmit, to at least one user equipment (UE) over a wireless narrowband channel, the extended NPRS sequence on the plurality of symbols of the single physical resource block corresponding to the plurality of symbol indexes and across the plurality of slots of the plurality of sequential radio frames corresponding to the plurality of slot numbers, wherein, based on a radio frame of the plurality of sequential radio frames coinciding with a wideband positioning reference signal (PRS) occasion, a PRS sequence of the wideband PRS occasion is utilized during the wideband PRS occasion instead of the extended NPRS sequence, and wherein, following the wideband PRS occasion, the plurality of slot numbers continues to increment for the remaining slots of the plurality of slots of the plurality of sequential radio frames.

20. An apparatus for measuring an extended narrowband positioning reference signals (NPRS) sequence, comprising:
a transceiver of a user equipment (UE) configured to receive, over a wireless narrowband channel, an NPRS of a first subset of the extended NPRS sequence, wherein the extended NPRS sequence is a function of a plurality of slot numbers of a plurality of slots of a plurality of sequential radio frames and a plurality of symbol indexes of a plurality of symbols of a single physical resource block, wherein a physical resource block index of the single physical resource block is incremented once for each of the plurality of sequential radio frames; and
at least one processor of the UE configured to measure the NPRS of the first subset of the extended NPRS sequence, wherein, based on a radio frame of the plurality of sequential radio frames coinciding with a wideband positioning reference signal (PRS) occasion, a PRS sequence of the wideband PRS occasion is utilized during the wideband PRS occasion instead of the extended NPRS sequence, and wherein, following the wideband PRS occasion, the plurality of slot numbers continues to increment for the remaining slots of the plurality of slots of the plurality of sequential radio frames.

* * * * *